US012377736B2

(12) United States Patent
Reimer et al.

(10) Patent No.: US 12,377,736 B2
(45) Date of Patent: Aug. 5, 2025

(54) VEHICLE BATTERY INTEGRATION SYSTEMS AND METHODS

(71) Applicant: Lyft, Inc., San Francisco, CA (US)

(72) Inventors: Andrew Michael Reimer, San Francisco, CA (US); Adam Christopher Bender, San Francisco, CA (US); Neil Richard Anthony Saldanha, San Francisco, CA (US); Timothy Rex Martin, San Francisco, CA (US); Jared Mitchell Kole, San Francisco, CA (US); Andrea Claude Ramos Santos, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 18/487,864

(22) Filed: Oct. 16, 2023

(65) Prior Publication Data
US 2024/0034159 A1  Feb. 1, 2024

Related U.S. Application Data

(63) Continuation of application No. 16/728,658, filed on Dec. 27, 2019, now Pat. No. 11,820,240.

(51) Int. Cl.
*B60L 50/64* (2019.01)

(52) U.S. Cl.
CPC ......... *B60L 50/64* (2019.02); *H01M 2220/20* (2013.01)

(58) Field of Classification Search
CPC ..................................................... B60L 50/64
See application file for complete search history.

(56) References Cited

U.S. PATENT DOCUMENTS

2012/0160578 A1*  6/2012  Tamagawa .......... B60R 16/0207
                                                          180/54.1
2021/0107571 A1*  4/2021  Fujisawa ............ B62D 25/2036

* cited by examiner

*Primary Examiner* — Olatunji A Godo
(74) *Attorney, Agent, or Firm* — Baker Botts L.L.P.

(57) ABSTRACT

Techniques are disclosed for systems and methods to provide modular battery assemblies for micro-mobility fleet vehicles. A modular battery assembly for a micro-mobility fleet vehicle includes a battery assembly enclosure including an assembly retention interface configured to physically secure the assembly enclosure to a subframe assembly of the micro-mobility fleet vehicle, a battery cell assembly disposed within the battery assembly enclosure, and an enclosure lid mounted to the assembly enclosure. The modular battery assembly may include an arched floorboard panel configured to provide a floor board surface for the micro-mobility fleet vehicle. The battery cell assembly may include a honeycomb battery cell holder and a collector board atop the battery cell holder to provide wire bond interconnects between the battery cells.

17 Claims, 32 Drawing Sheets

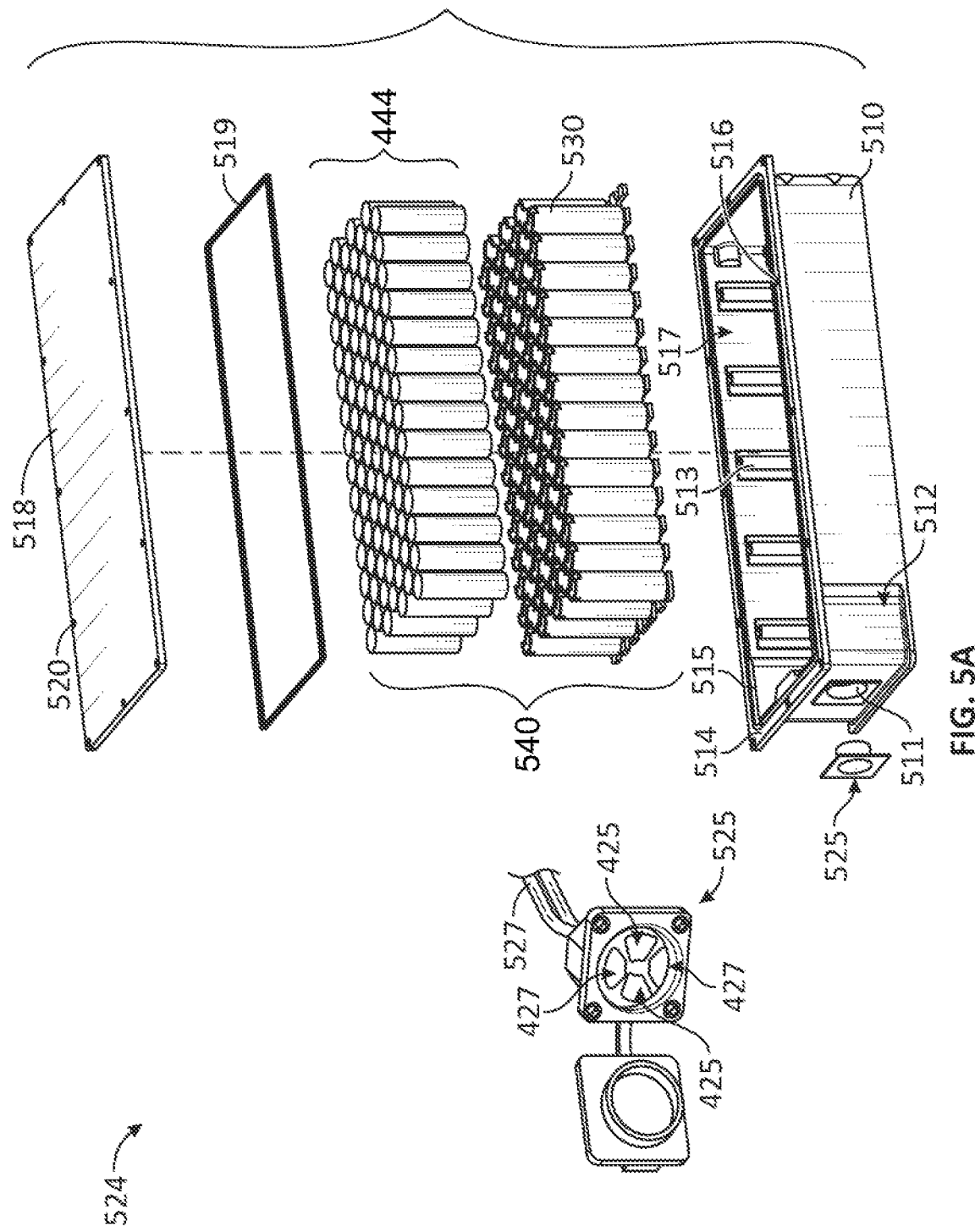

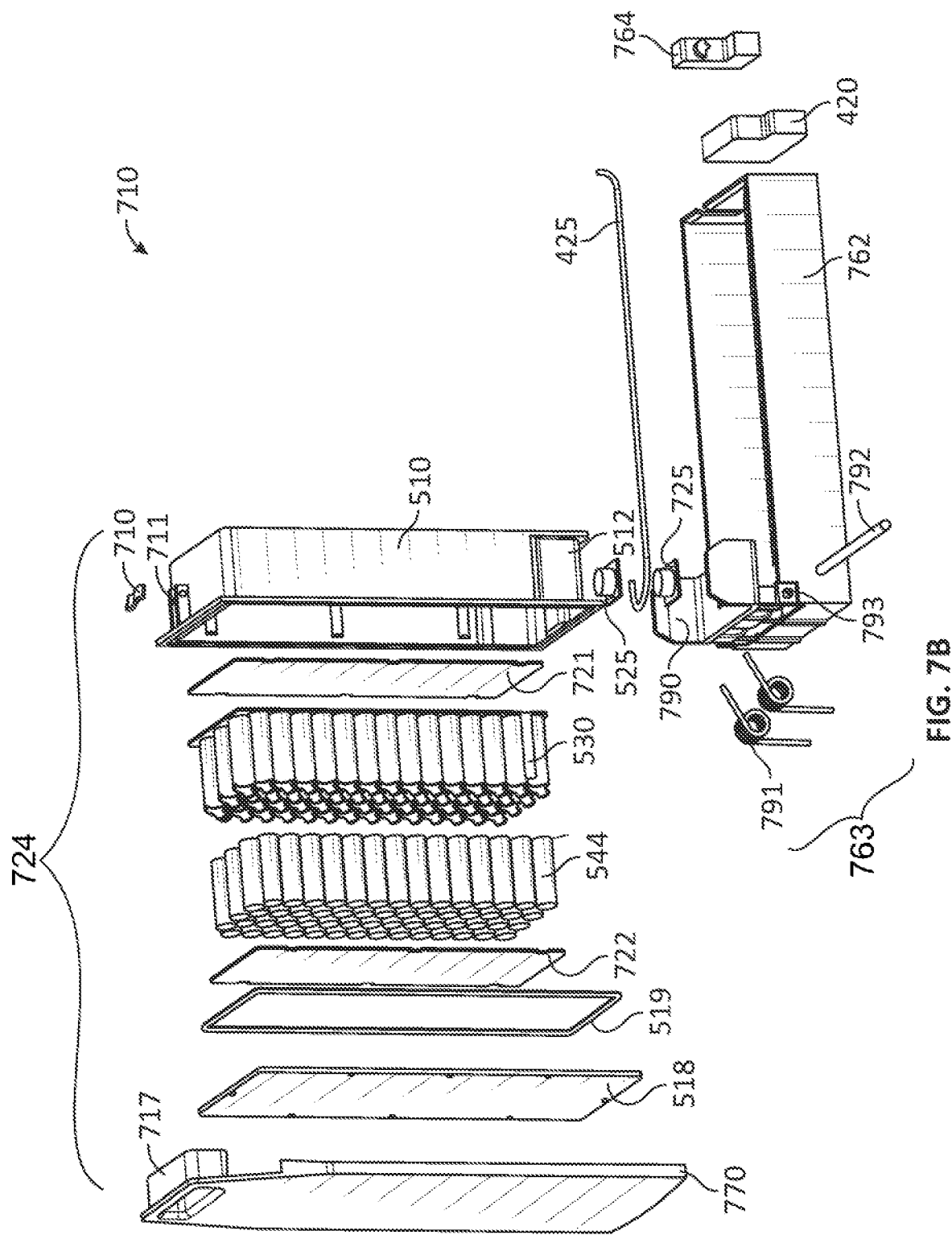

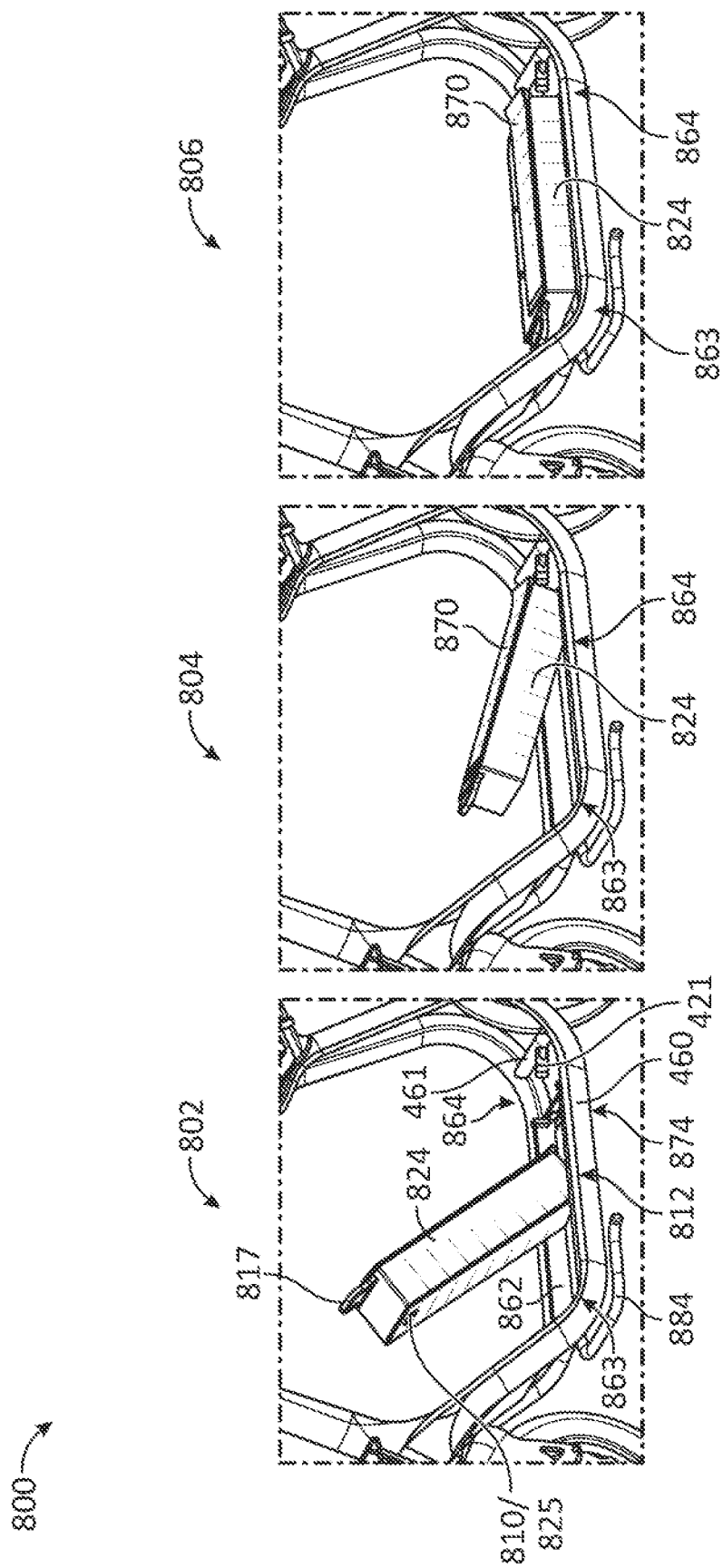

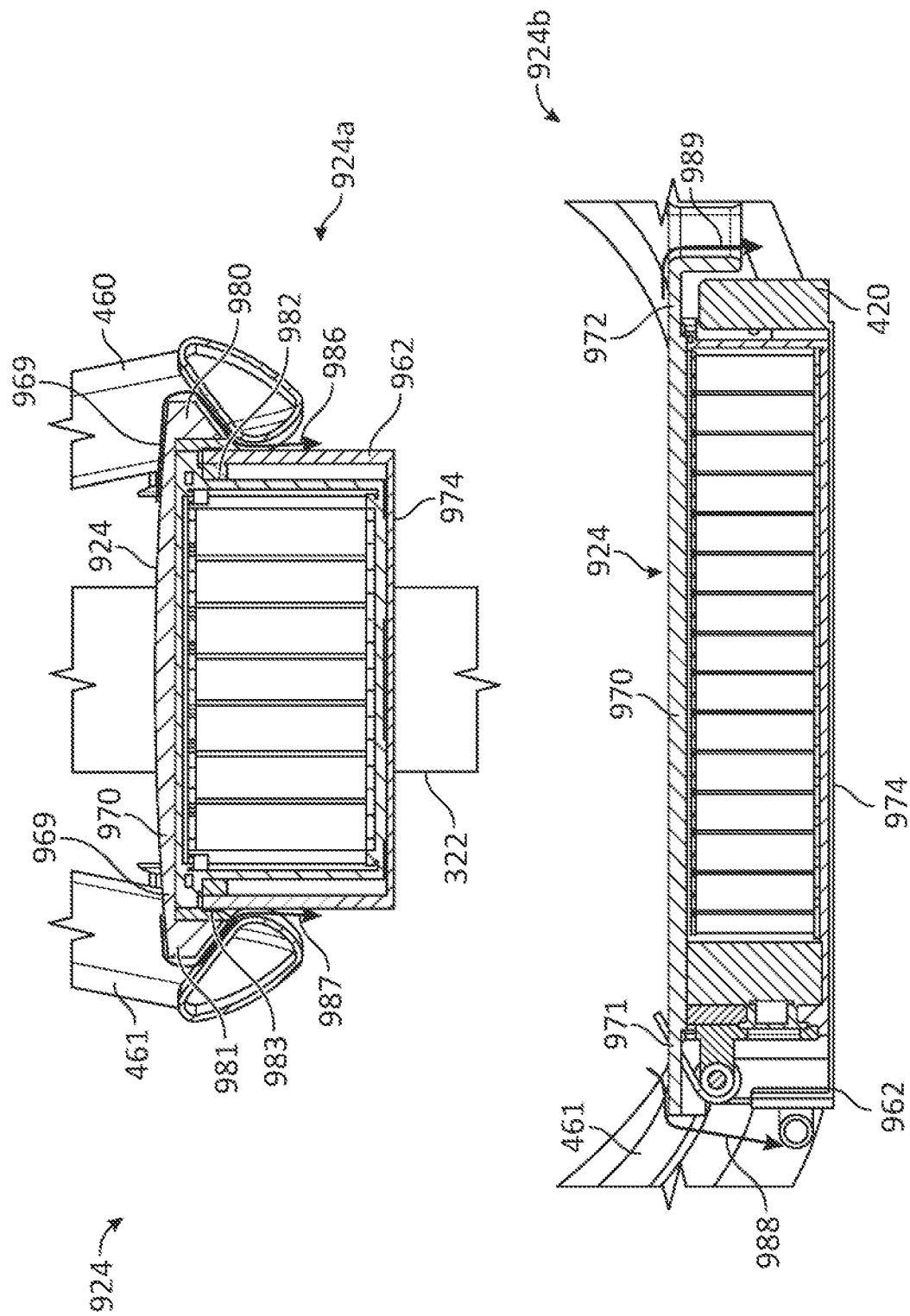

US 12,377,736 B2

VEHICLE BATTERY INTEGRATION SYSTEMS AND METHODS

PRIORITY

This application is a continuation under 35 U.S.C. § 120 of U.S. patent application Ser. No. 16/728,658, filed 27 Dec. 2019, which is incorporated herein by reference.

TECHNICAL FIELD

One or more embodiments of the present disclosure relate generally to powering electric vehicles and more particularly, for example, to systems and methods for providing modular battery assemblies for electric vehicles.

BACKGROUND

Contemporary transportation services may incorporate a variety of different types of vehicles, including motorized or electric kick scooters, bicycles, and/or motor scooters generally designed to transport one or two people at once (collectively, micro-mobility fleet vehicles). While micro-mobility fleet vehicles provide an additional dimension of transportation flexibility, particularly when such vehicles are incorporated into a dynamic transportation matching system that links requestors or riders to fleet vehicles for hire or temporary rental and personal use, such flexibility is only realizable if a significant portion of the fleet is ready for operation and/or individual nonoperational fleet vehicles can be quickly serviced and made operational. As such, servicing a relatively extensive fleet of micro-mobility fleet vehicles can present a significant and cumbersome but necessary capital investment and labor (e.g., time and cost) burden to a fleet manager/servicer.

Therefore, there is a need in the art for systems and methods to reduce fleet servicer burdens associated with servicing micro-mobility fleet vehicles, particularly in the context of a dynamic transportation matching system providing transportation services incorporating such micro-mobility fleet vehicles.

SUMMARY

Techniques are disclosed for systems and methods to provide modular battery assemblies for micro-mobility fleet vehicles. In accordance with one or more embodiments, a modular battery assembly for a micro-mobility fleet vehicle may include a rectangular cuboid shaped battery assembly enclosure comprising an enclosure cavity, a battery assembly electrical interface, a head assembly retention interface disposed along a front portion of the battery assembly enclosure, and a tail assembly retention interface disposed along a rear portion of the battery assembly enclosure, wherein the head and tail assembly retention interfaces are configured to physically secure the assembly enclosure to a subframe assembly mounted to the micro-mobility fleet vehicle; a battery cell assembly disposed within the enclosure cavity and electrically coupled to the battery assembly electrical interface of the battery assembly enclosure; an enclosure lid mounted to the assembly enclosure and configured to seal the enclosure cavity and to prevent ambient moisture from entering the battery assembly enclosure; and an arched floorboard panel disposed along a top portion of the enclosure lid and configured to provide a floorboard surface for the micro-mobility fleet vehicle, wherein the arched floorboard panel and the battery assembly enclosure are configured to distribute a step weight of a rider of the micro-mobility fleet vehicle along the subframe assembly mounted to the micro-mobility fleet vehicle.

In additional embodiments, a method for replacing a modular battery assembly for a micro-mobility fleet vehicle may include receiving a release request for a first modular battery assembly coupled to a micro-mobility fleet vehicle; releasing the first modular battery assembly; and detecting installation of a second modular battery assembly, wherein the first modular battery assembly comprises a battery assembly enclosure comprising an enclosure cavity, a battery assembly electrical interface, and an assembly retention interface disposed along the battery assembly enclosure, wherein the assembly retention interface is configured to physically secure the assembly enclosure to a subframe assembly mounted to the micro-mobility fleet vehicle; a battery cell assembly disposed within the enclosure cavity and electrically coupled to the battery assembly electrical interface; an enclosure lid mounted to the assembly enclosure and configured to seal the enclosure cavity and to prevent ambient moisture from entering the battery assembly enclosure; and an arched floorboard panel disposed along a top portion of the enclosure lid and configured to provide a floorboard surface for the micro-mobility fleet vehicle.

According to some embodiments, a non-transitory machine-readable medium may include a plurality of machine-readable instructions which when executed by one or more processors are adapted to cause the one or more processors to perform a method. In some embodiments, the method may include receiving a release request for a first modular battery assembly coupled to a micro-mobility fleet vehicle; releasing the first modular battery assembly; and detecting installation of a second modular battery assembly, wherein the first modular battery assembly comprises a battery assembly enclosure comprising an enclosure cavity, a battery assembly electrical interface, and an assembly retention interface disposed along the battery assembly enclosure, wherein the assembly retention interface is configured to physically secure the assembly enclosure to a subframe assembly mounted to the micro-mobility fleet vehicle; a battery cell assembly disposed within the enclosure cavity and electrically coupled to the battery assembly electrical interface; an enclosure lid mounted to the assembly enclosure and configured to seal the enclosure cavity and to prevent ambient moisture from entering the battery assembly enclosure; and an arched floorboard panel disposed along a top portion of the enclosure lid and configured to provide a floorboard surface for the micro-mobility fleet vehicle.

In accordance with one or more additional embodiments, a modular battery assembly for a micro-mobility fleet vehicle may include a battery assembly enclosure comprising an enclosure cavity and a battery assembly electrical interface; a battery cell assembly comprising a plurality of battery cells disposed within the enclosure cavity and electrically coupled to the battery assembly electrical interface of the battery assembly enclosure; and an enclosure lid mounted to the assembly enclosure and configured to seal the enclosure cavity and to prevent ambient moisture from entering the battery assembly enclosure. The battery cell assembly may include honeycomb battery cell holder comprising a hexagonally packed array of hexagonal prism shaped battery cell cavities extending along a full length of each one of the plurality of battery cells enclosed therein; and a collector board disposed atop the honeycomb battery cell holder and including an array of battery cell access wells and board pads exposed at a top surface of the collector board and configured to provide physical access to each battery cell sufficient to wire bond each positive terminal and negative terminal of each battery cell to a corresponding board pad.

In additional embodiments, a method for replacing a modular battery assembly for a micro-mobility fleet vehicle may include receiving a release request for a first modular battery assembly coupled to a micro-mobility fleet vehicle; releasing the first modular battery assembly; and detecting installation of a second modular battery assembly, wherein the first modular battery assembly comprises a battery assembly enclosure comprising an enclosure cavity and a battery assembly electrical interface; a battery cell assembly comprising a plurality of battery cells disposed within the enclosure cavity and electrically coupled to the battery assembly electrical interface of the battery assembly enclosure; and an enclosure lid mounted to the assembly enclosure and configured to seal the enclosure cavity and to prevent ambient moisture from entering the battery assembly enclosure. The battery cell assembly may include a honeycomb battery cell holder comprising a hexagonally packed array of hexagonal prism shaped battery cell cavities extending along a full length of each one of the plurality of battery cells enclosed therein.

According to some embodiments, a non-transitory machine-readable medium may include a plurality of machine-readable instructions which when executed by one or more processors are adapted to cause the one or more processors to perform a method. In some embodiments, the method may include receiving a release request for a first modular battery assembly coupled to a micro-mobility fleet vehicle; releasing the first modular battery assembly; and detecting installation of a second modular battery assembly, wherein the first modular battery assembly comprises a battery assembly enclosure comprising an enclosure cavity and a battery assembly electrical interface; a battery cell assembly comprising a plurality of battery cells disposed within the enclosure cavity and electrically coupled to the battery assembly electrical interface of the battery assembly enclosure; and an enclosure lid mounted to the assembly enclosure and configured to seal the enclosure cavity and to prevent ambient moisture from entering the battery assembly enclosure. The battery cell assembly may include a honeycomb battery cell holder comprising a hexagonally packed array of hexagonal prism shaped battery cell cavities extending along a full length of each one of the plurality of battery cells enclosed therein.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 5A-B illustrate various aspects of a modular battery assembly for a micro-mobility fleet vehicle in accordance with embodiments of the disclosure.

FIGS. 6A-J illustrate various aspects of a modular battery assembly for a micro-mobility fleet vehicle in accordance with embodiments of the disclosure.

FIGS. 7A-E illustrate various aspects of a modular battery assembly for a micro-mobility fleet vehicle in accordance with embodiments of the disclosure.

FIGS. 8A-D illustrate various aspects of a modular battery assembly for a micro-mobility fleet vehicle in accordance with embodiments of the disclosure.

FIGS. 9A-B illustrate various aspects of a modular battery assembly for a micro-mobility fleet vehicle in accordance with embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
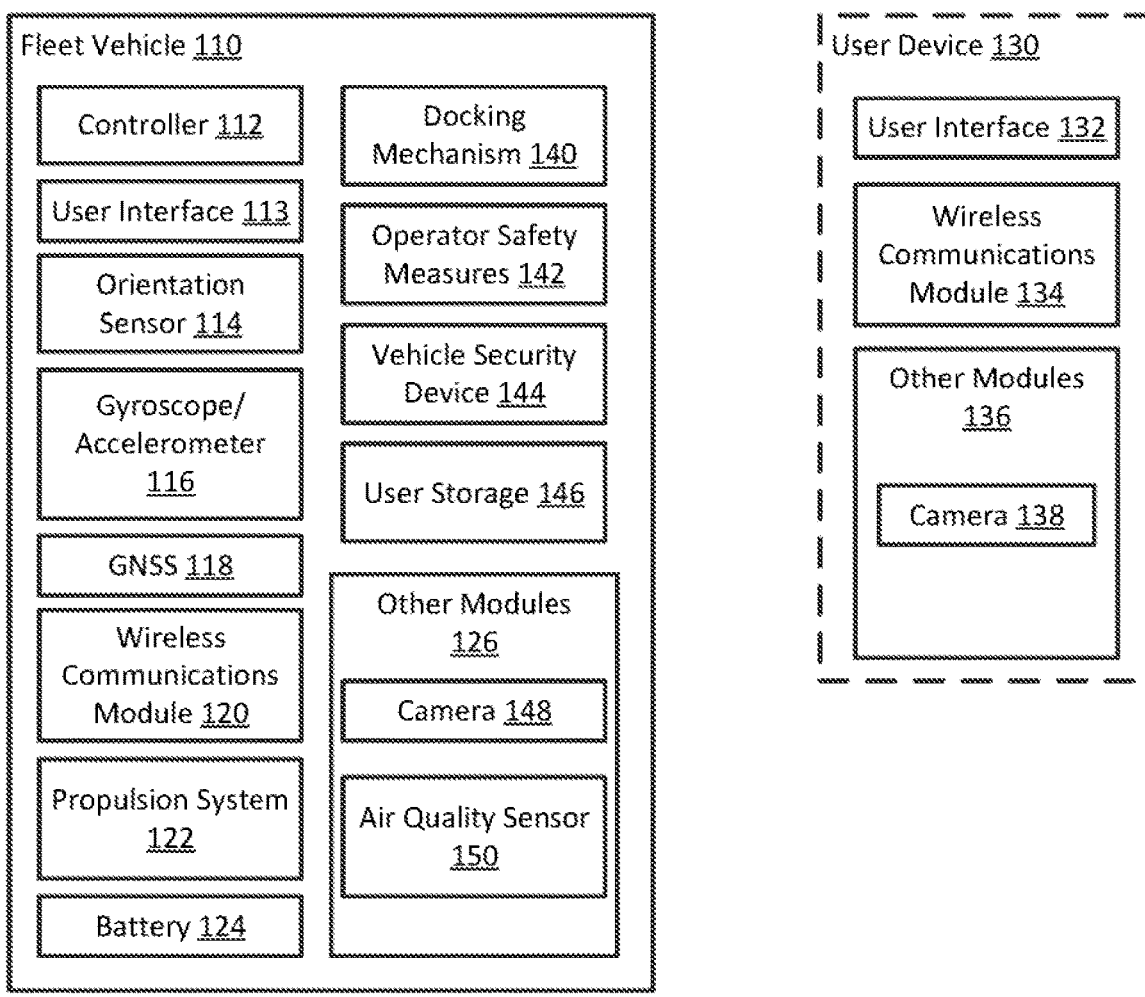
FIG. 1 illustrates a block diagram of a portion of a dynamic transportation matching system including a fleet vehicle in accordance with an embodiment of the disclosure.

In accordance with various embodiments of the present disclosure, modular battery assemblies for micro-mobility fleet vehicles and related methodologies are provided to reduce burdens associated with servicing micro-mobility fleet vehicles (e.g., electric kick scooters, bicycles, motor scooters, and/or other vehicles generally designed to transport one or two people at once). For example, a modular battery assembly may include assembly retention interfaces configured to physically secure the modular battery assembly to a subframe assembly that can be mounted to a number of different micro-mobility fleet vehicles and/or different types of micro-mobility fleet vehicles, such that manufacturing efficiencies can be realized for overall reduced capital investment expenditures related to maintaining an operational fleet of such vehicles. Moreover, the assembly retention interfaces and corresponding retention mechanisms (e.g., integrated with the subframe assembly), along with other characteristics of the modular battery assembly, may be designed and/or configured to increase ease of battery replacement (e.g., removal and/or installation) for micro-mobility fleet vehicles, thereby reducing costs involved in the labor used to service each micro-mobility fleet vehicle.

In some embodiments, a modular battery assembly may include structural elements to allow the modular battery assembly to form a weight bearing portion (e.g., a floorboard surface) of the micro-mobility fleet vehicle, which may be shaped and/or designed to ease battery replacement and reduce overall weight by eliminating a need for separate structural elements of the micro-mobility fleet vehicle to provide the weight bearing portion, as described herein. In various embodiments, a modular battery assembly may include logic devices and/or memory or data storage devices and/or interfaces configured to monitor, store, and report battery monitoring data (e.g., number and depth of charge cycles, temperature profiles, cell status, estimated charge capacity, power delivery characteristics, and/or other battery monitoring data), for example, and/or to receive vehicle status data (e.g., location, usage statistics, power utilization efficiency statistics, other sensor data, other vehicle status data) and monitor, store, and report such received vehicle status data, such as to a field servicer while charging, as described herein. In a particular embodiment, such logic and/or memory or data storage devices/interfaces may be configured to receive firmware and/or other fleet servicer distribution data while charging, for example, and to provide such fleet servicer distribution data to components of a micro-mobility fleet vehicle upon installation into the micro-mobility fleet vehicle, so as to reduce resource utilization (e.g., communication, labor, and other technological and/or infrastructural resources) that would otherwise be necessary in providing similar servicing of micro-mobility fleet vehicles, particularly when the micro-mobility fleet vehicles form part of a dynamic transportation matching system, as described herein.

FIG. 1 illustrates a block diagram of a portion of a dynamic transportation matching system (e.g., system 100) including a fleet vehicle 110 in accordance with an embodiment of the disclosure. In the embodiment shown in FIG. 1, system 100 includes fleet vehicle 110 and optional user device 130. In general, fleet vehicle 110 may be a passenger vehicle designed to transport a single user (e.g., a micro-mobility fleet vehicle) or a group of people (e.g., a typical car or truck). More specifically, fleet vehicle 110 may be implemented as a motorized or electric kick scooter, bicycle, and/or motor scooter designed to transport one or perhaps two people at once typically on a paved road (collectively, micro-mobility fleet vehicles), as a typical automobile configured to transport up to 4, 7, or 10 people at once, or according to a variety of different transportation modalities (e.g., transportation mechanisms). Fleet vehicles similar to fleet vehicle 110 may be owned, managed, and/or serviced primarily by a fleet manager/servicer providing fleet vehicle 110 for rental and use by the public as one or more types of transportation modalities offered by a dynamic transportation matching system, for example, or may be owned, managed, and/or serviced by a private owner using the dynamic transportation matching system to match their vehicle to a transportation request, such as with ridesharing or ride-sourcing applications typically executed on a mobile user device, such as user device 130 as described herein. Optional user device 130 may be a smartphone, tablet, near field communication (NFC) or radio-frequency identification (RFID) enabled smart card, or other personal or portable computing and/or communication device that may be used to facilitate rental and/or operation of fleet vehicle 110.

As shown in FIG. 1, fleet vehicle 110 may include one or more of a controller 112, a user interface 113, an orientation sensor 114, a gyroscope/accelerometer 116, a global navigation satellite system receiver (GNSS) 118, a wireless communications module 120, a camera 148, a propulsion system 122, an air quality sensor 150, and other modules 126. Operation of fleet vehicle 110 may be substantially manual, autonomous, and/or partially or completely controlled by optional user device 130, which may include one or more of a user interface 132, a wireless communications module 134, a camera 138, and other modules 136. In other embodiments, fleet vehicle 110 may include any one or more of the elements of user device 130. In some embodiments, one or more of the elements of system 100 may be implemented in a combined housing or structure that can be coupled to or within fleet vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory or data storage device, memory reader, or other device or combinations of devices) that may be adapted to execute, store, and/or receive appropriate instructions, such as software instructions implementing a control loop for controlling various operations of fleet vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of fleet vehicle 110, for example, or distributed as multiple logic devices within fleet vehicle 110 and/or user device 130.

In some embodiments, controller 112 may be configured to substantially continuously monitor and/or store the status of and/or sensor data provided by one or more elements of fleet vehicle 110 and/or user device 130, such as the position and/or orientation of fleet vehicle 110 and/or user device 130, for example, and the status of a communication link established between fleet vehicle 110 and/or user device 130. Such communication links may be established and then provide for transmission of data between elements of system 100 substantially continuously throughout operation of system 100, where such data includes various types of sensor data, control parameters, and/or other data.

User interface 113 of fleet vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of fleet vehicle 110 and/or other elements of system 100. For example, user interface 113 may be adapted to display a time series of positions, headings, and/or orientations of fleet vehicle 110 and/or other elements of system 100 overlaid on a of 44 geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause fleet vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of fleet vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of fleet vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of fleet vehicle 110 (e.g., or an element of fleet vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to fleet vehicle 110 and to monitor the status of a communication link established between fleet vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to fleet vehicle 110 and/or to steer fleet vehicle 110. In some embodiments, propulsion system 122 may include elements that can be controlled (e.g., by controller 112 and/or user interface 113) to provide motion for fleet vehicle 110 and to provide an orientation for fleet vehicle 110. In various embodiments, propulsion system 122 may be implemented with a portable power supply, such as a battery and/or a combustion engine/generator and fuel supply.

For example, in some embodiments, such as when propulsion system 122 is implemented by an electric motor (e.g., as with many micro-mobility fleet vehicles), fleet vehicle 110 may include battery 124. Battery 124 may be implemented by one or more battery cells (e.g., lithium ion battery cells) and be configured to provide electrical power to propulsion system 122 to propel fleet vehicle 110, for example, as well as to various other elements of system 100, including controller 112, user interface 113, and/or wireless communications module 120. In some embodiments, battery 123 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of fleet vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of fleet vehicle 110 and/or system 100. In further embodiments, other modules 126 may include a light, such as a headlight or indicator light, and/or an audible alarm, both of which may be activated to alert passersby to possible theft, abandonment, and/or other critical statuses of fleet vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about fleet vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micro-mobility fleet vehicle, as described herein.

Fleet vehicles implemented as micro-mobility fleet vehicles may include a variety of additional features designed to facilitate fleet management and user and environmental safety. For example, as shown in FIG. 1, fleet vehicle 110 may include one or more of docking mechanism 140, operator safety measures 142, vehicle security device 144, and/or user storage 146, as described in more detail herein.

In particular, in some embodiments, operator safety measures 142 may be implemented as one or more of a headlight, a taillight, ambient lighting, a programmable lighting element (e.g., a multi-color panel, strip, or array of individual light elements, such as addressable light emitting diodes (LEDs), recessed and/or directional lighting, actuated lighting (e.g., articulated lighting coupled to an actuator), and/or other lighting coupled to and/or associated with fleet vehicle 110 and controlled by controller 112. In other embodiments, operator safety measures 142 may include a speaker or other audio element configured to generate an audible alarm or sound to warn a rider or passersby of a detected safety concern, for example, or to inform a rider of a potential safety concern. More generally, operator safety measures 142 may be any electronic, mechanical, or electromechanical device or subsystem configured to increase the safety of a rider and/or mitigate potential harm to a rider under nominal operating conditions.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of fleet vehicle 110 and/or other elements of system 100. For example, user interface 132 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause fleet vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to transmit control signals from user interface 132 to wireless communications module 120. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or fleet vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further of 44 processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of fleet vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 112 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory or data storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for fleet vehicle 110, using one or more power leads. Such power leads may also be used to support one or more communication techniques between elements of system 100.

Figure 2:
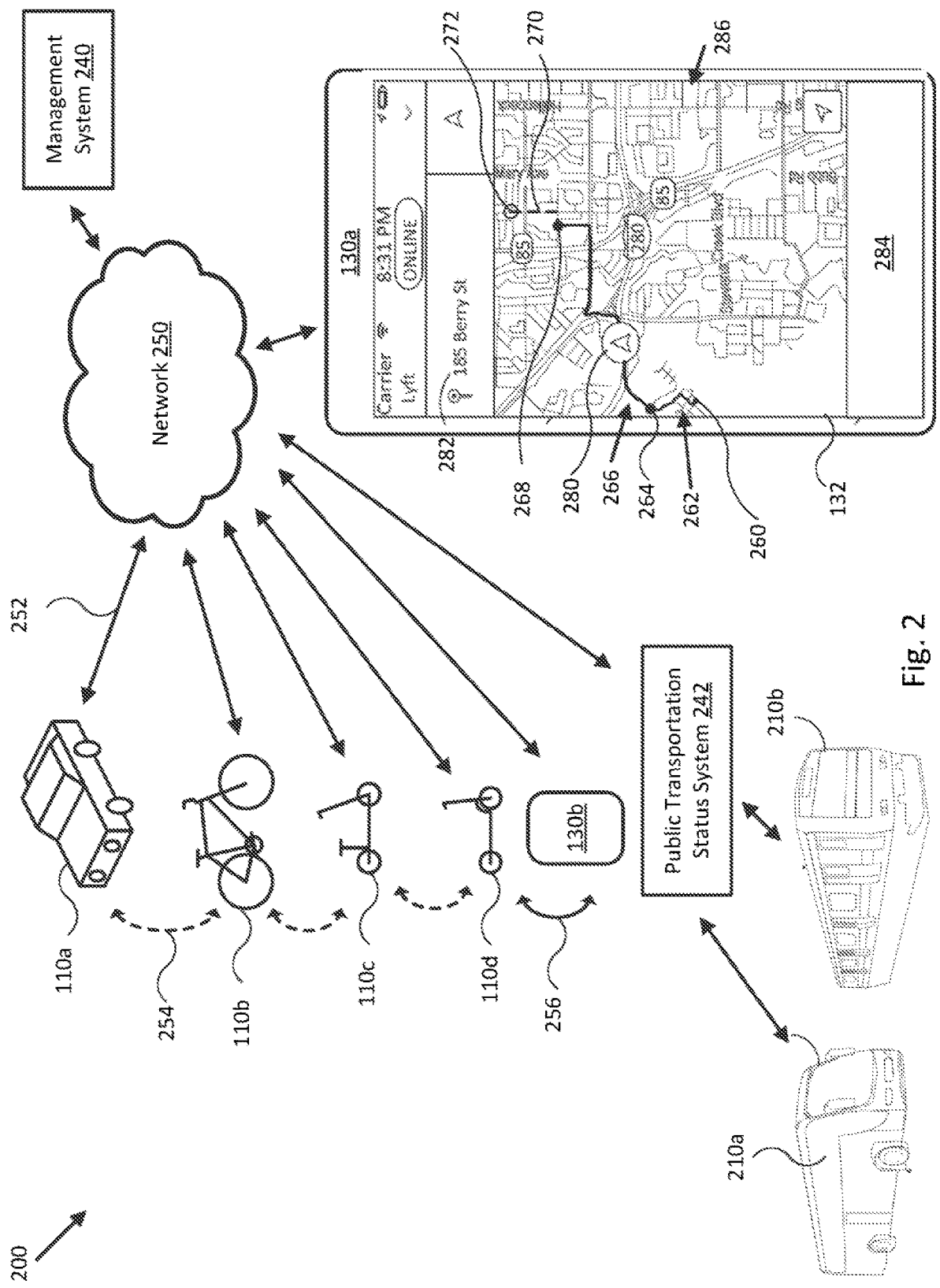
FIG. 2 illustrates a block diagram of a dynamic transportation matching system incorporating a variety of transportation modalities in accordance with embodiments of the disclosure.

FIG. 2 illustrates a block diagram of dynamic transportation matching system 200 incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes management system/server 240 in communication with a number of fleet vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all fleet vehicles are able to communicate directly to WAN 250 and, in some embodiments, may be able to communicate across mesh network communication links 254, to convey fleet data and/or fleet status data amongst themselves and/or to and from management system 240.

In FIG. 2, a requestor may use user device 130a to hire or rent one of fleet vehicles 110a-d by transmitting a transportation request to management system 240 over WAN 250, allowing management system 240 to poll status of fleet vehicles 110a-d and to select one of fleet vehicles 110a-d to fulfill the transportation request; receiving a fulfillment notice from management system 240 and/or from the selected fleet vehicle, and receiving navigation instructions to proceed to or otherwise meet with the selected fleet vehicle. A similar process may be used by a requestor using user device 130b, but where the requestor is able to enable a fleet vehicle over local communication link 263, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of fleet vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among fleet vehicles 110a-d, as described herein.

User device 130a in FIG. 2 includes a display of user interface 132 that shows a planned route for a user attempting to travel from origination point 260 to destination 272 using different transportation modalities (e.g., a planned multimodal route), as depicted in route/street map 286 rendered by user interface 132. For example, management system 240 may be configured to monitor statuses of all available transportation modalities (e.g., including fleet vehicles and public transportation vehicles) and provide a planned multimodal route from origination point 260 to destination 272. Such planned multimodal route may include, for example, walking route 262 from origination point 260 to bus stop 264, bus route 266 from bus stop 264 to bus stop 268, and micro-mobility route 270 (e.g., using one of micro-mobility fleet vehicles 110b, 110c, or 110d) from bus stop 268 to destination 272. Also shown rendered by user interface 132 are present location indicator 280 (indicating a present absolute position of user device 130a on street map 286), navigation destination selector/indicator 282 (e.g., configured to allow a user to input a desired navigation destination), and notice window 284 (e.g., used to render fleet status data, including user notices and/or alerts, as described herein). For example, a user may use navigation destination selector/indicator 282 to provide and/or change destination 272, as well as change any leg or modality of the multimodal route from origination point 260 to destination 272. In some embodiments, notice window 284 may display instructions for traveling to a next waypoint along the determined multimodal route (e.g., directions to walk to a bus stop, directions to ride a micro-mobility fleet vehicle to a next stop along the route, etc.).

In various embodiments, management system 240 may be configured to provide or suggest an optimal multimodal route to a user (e.g., initially and/or while traversing a particular planned route), and a user may select or make changes to such route through manipulation of user device 130a, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share fleet vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
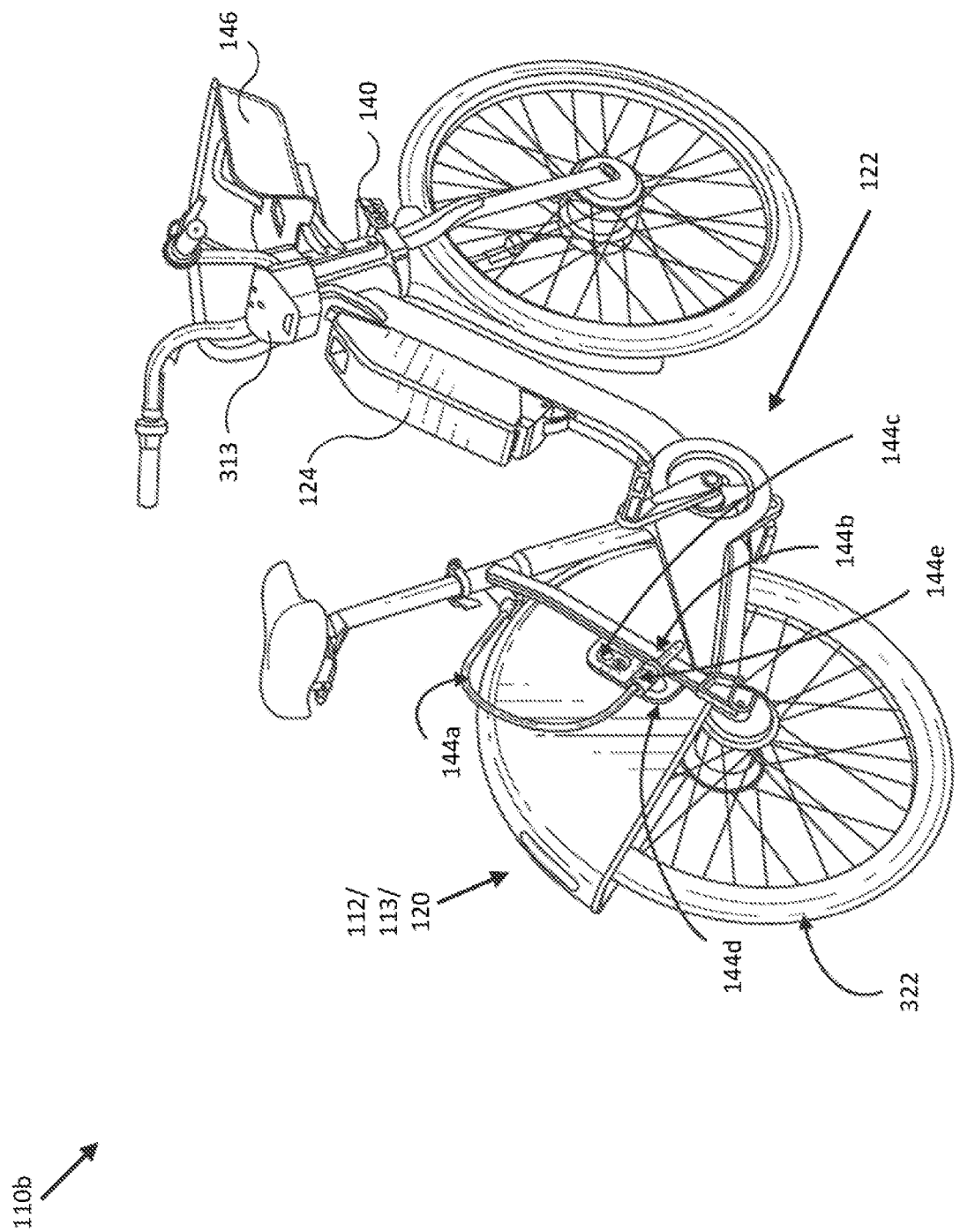
FIGS. 3A-D illustrate diagrams of micro-mobility fleet vehicles for use in a dynamic transportation matching system in accordance with embodiments of the disclosure.
Figure 3B:
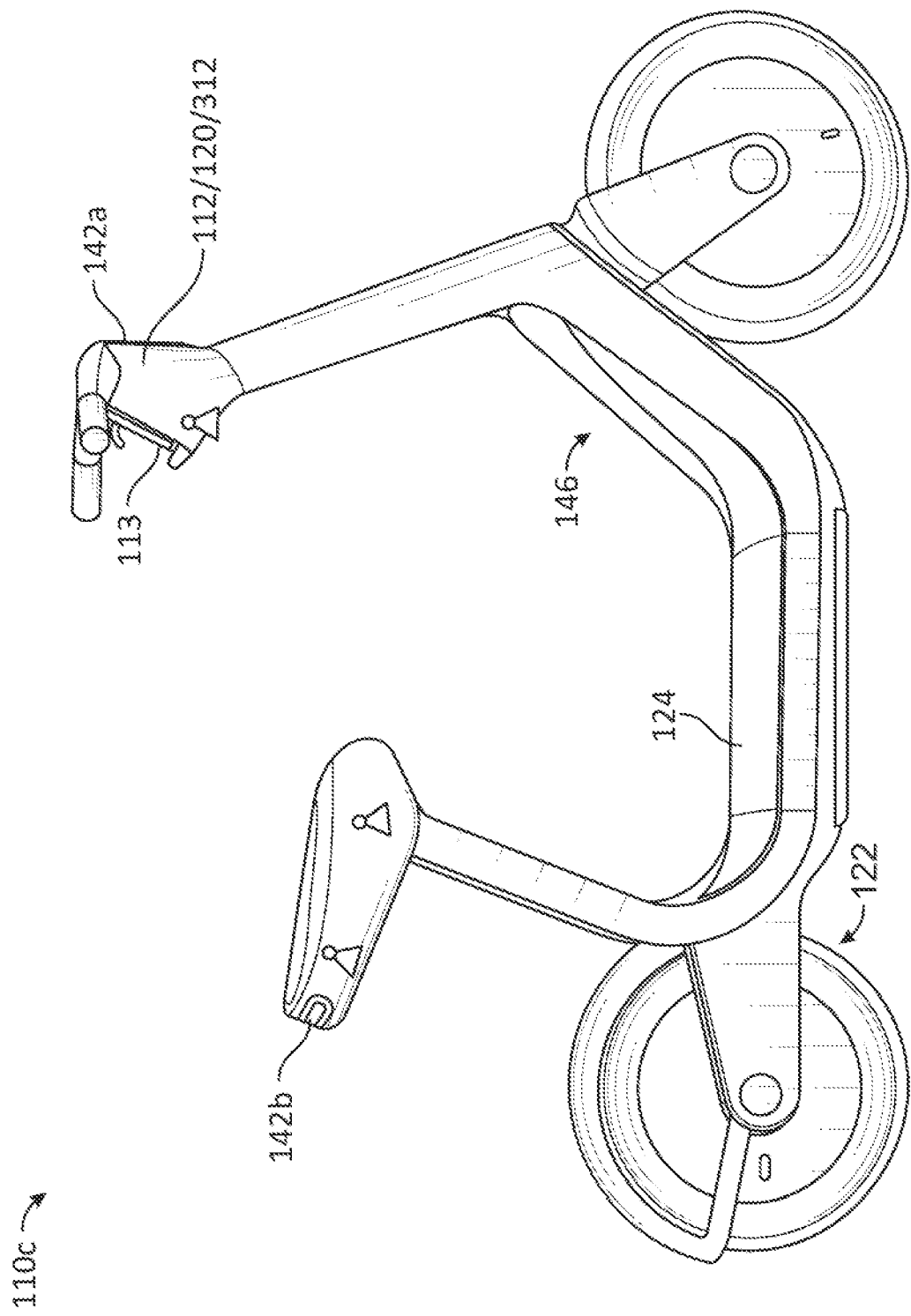
Figure 3C:
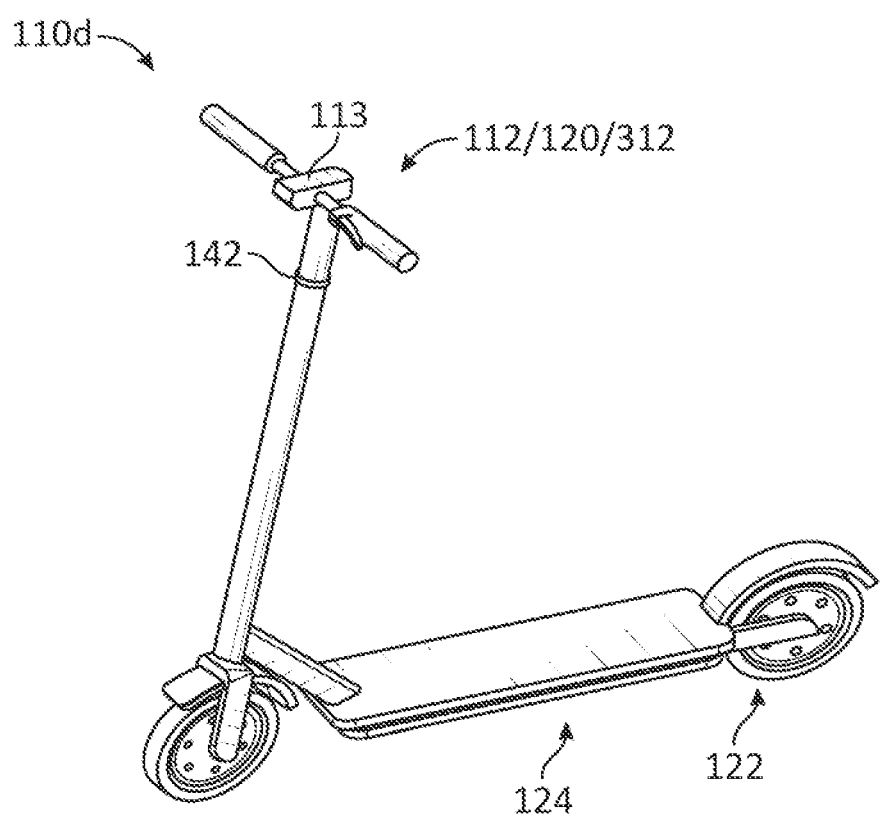

FIGS. 3A-C illustrate diagrams of micro-mobility fleet vehicles 110b, 110c, and 110d, which may be integrated with mobile mesh network provisioning systems in accordance with an embodiment of the disclosure. For example, fleet vehicle 110b of FIG. 3A may correspond to a motorized bicycle for hire that is integrated with the various elements of system 100 and may be configured to participate in dynamic transportation matching system 200 of FIG. 2. As shown, fleet vehicle 110b includes controller/user interface/wireless communications module 112/113/120 (e.g., integrated with a rear fender of fleet vehicle 110b), propulsion system 122 configured to provide motive power to at least one of the wheels (e.g., a rear wheel 322) of fleet vehicle 110b, battery 124 for powering propulsion system 122 and/or other elements of fleet vehicle 110b, docking mechanism 140 (e.g., a spade lock assembly) for docking fleet vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilizing rear wheel 322 of fleet vehicle 110b, such as by engaging pin 144b with spokes of rear wheel 322. In the embodiment shown in FIG. 3A, vehicle security device 144 of 44 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize fleet vehicle 110b by default, thereby requiring a user to transmit a hire request to management system 240 (e.g., via user device 130) to hire fleet vehicle 110b before attempting to use fleet vehicle 110b. The hire request may identify fleet vehicle 110b based on an identifier (e.g., a QR code, a barcode, a serial number, etc.) presented on fleet vehicle 110b (e.g., such as by user interface 113 on a rear fender of fleet vehicle 110b). Once the hire request is approved (e.g., payment is processed), management system 240 may transmit an unlock signal to fleet vehicle 110b (e.g., via network 250). Upon receiving the unlock signal, fleet vehicle 110b (e.g., controller 112 of fleet vehicle 110b) may release vehicle security device 144 and unlock rear wheel 322 of fleet vehicle 110b.

Fleet vehicle 110c of FIG. 3B may correspond to a motorized sit-scooter for hire that is integrated with the various elements of system 100 and may be configured to participate in dynamic transportation matching system 200 of FIG. 2. As shown in FIG. 3B, fleet vehicle 110c includes many of the same elements as those discussed with respect to fleet vehicle 110b of FIG. 3A. For example, fleet vehicle 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of headlight assemblies, taillight assemblies, programmable light elements/strips/spotlights, and/or reflective strips, as described herein. As shown in FIG. 3B, fleet vehicle 110c may also be implemented with various other vehicle light assemblies to increase visibility, to provide ambient lighting, and/or to provide lighted beaconing, as described herein.

Fleet vehicle 110d of FIG. 3C may correspond to a motorized stand or kick scooter for hire that is integrated with the various elements of system 100 and may be configured to participate in dynamic transportation matching system 200 of FIG. 2. As shown in FIG. 3C, fleet vehicle 110d includes many of the same elements as those discussed with respect to fleet vehicle 110b of FIG. 3A. For example, fleet vehicle 110d may include user interface 113, propulsion system 122, battery 124, controller/wireless communications module/cockpit enclosure 112/120/312, and operator safety measures 142, which may be implemented as various types of programmable light strips and/or reflective strips, as shown.

Figure 3D:
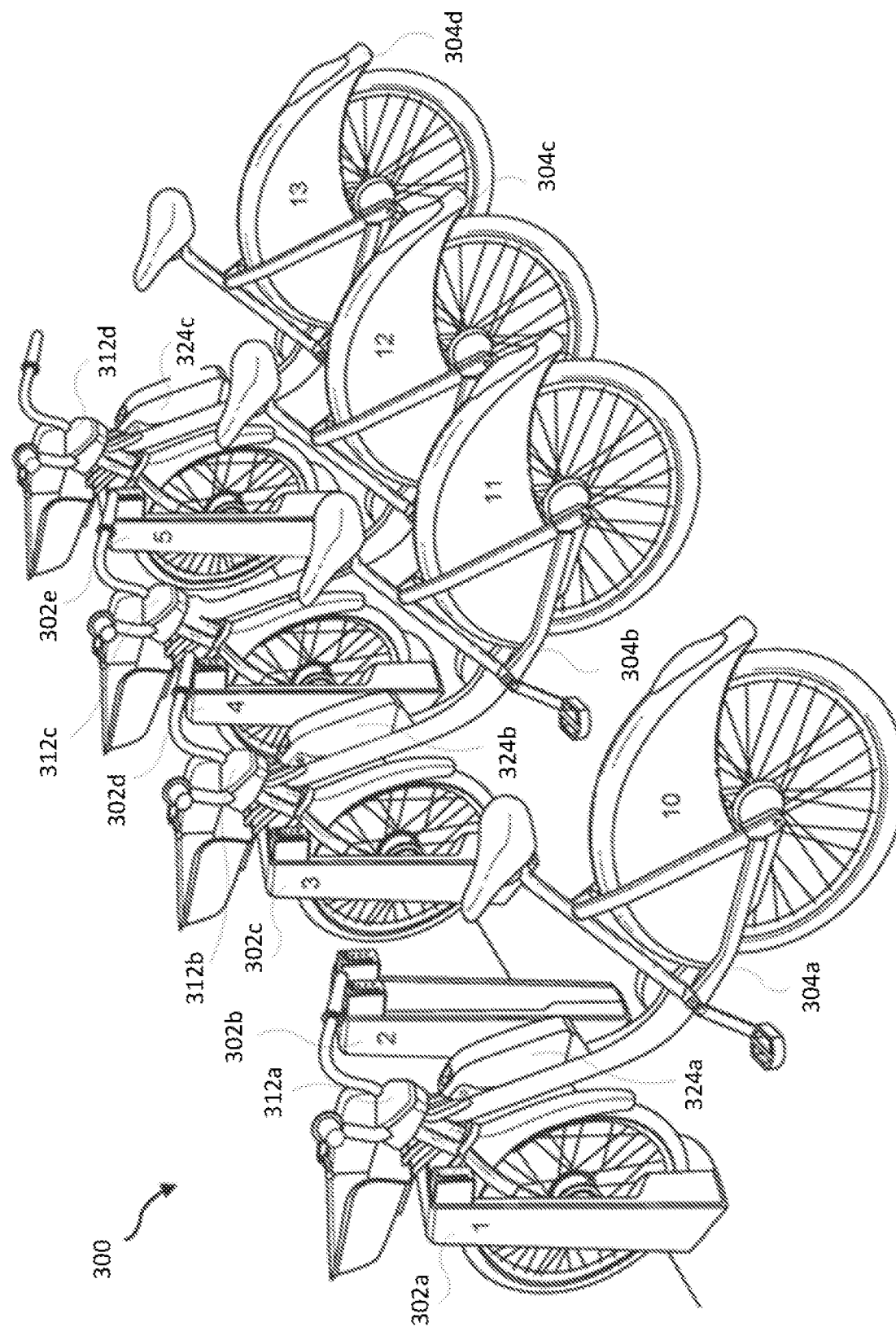

FIG. 3D illustrates a docking station 300 for docking fleet vehicles (e.g., fleet vehicles 110c, 110e, and 110g, etc.) in accordance with embodiments of the disclosure. As shown in FIG. 3D, docking station 300 may include multiple bicycle docks, such as docks 302a-e. For example, a single fleet vehicle (e.g., any one of electric bicycles 304a-d) may dock in each of docks 302a-e of docking station 300. Each of docks 302a-e may include a lock mechanism for receiving and locking docking mechanism 140 of electric bicycles 304a-d. In some embodiments, once a fleet vehicle is docked in a bicycle dock, the dock may be electronically and/or communicatively coupled to the fleet vehicle (e.g., to controllers and/or wireless communications modules integrated within cockpit enclosures 312a-d of fleet vehicles 304a-d) via a communication link such that the fleet vehicle may be charged by the dock and the fleet vehicle and the dock may communicate with each other via the communication link (e.g., similar to communications over mobile mesh network 260), as described herein.

For example, a requestor may use user device 130a to reserve, rent, and/or hire a fleet vehicle docked to one of bicycle docks 302a-e by transmitting a reservation request to management system 240. Once the reservation request is processed, management system 240 may transmit an unlock signal to a docked fleet vehicle and/or one of docks 302a-e via network 250 and/or mobile mesh network 260. One of docks 302a-e may automatically unlock an associated lock mechanism to release the fleet vehicle based, at least in part, on such unlock signal. In some embodiments, each of docks 302a-e may be configured to charge batteries (e.g., batteries 324a-c) of electric bicycles 304a-d while electric bicycles 304a-d are docked at docks 302a-e. In some embodiments, docking station 300 may also be configured to transmit status information associated with docking station 300 (e.g., a number of fleet vehicles docked at docking station 300, charge statuses of docked fleet vehicles, and/or other fleet status information) to management system 240.

In various embodiments, each of micro-mobility fleet vehicles 110b-d may be implemented with a subframe assembly configured to receive a modular battery assembly configured to power each one of micro-mobility fleet vehicles 110b-d. As described herein, such modular battery assembly may include various features designed to ease battery replacement, reduce overall vehicle weight, and provide additional service burden-reducing functionality configured to help form a reliable and robust propulsion system and/or propulsion control system for micro-mobility fleet vehicles.

Figure 4A:
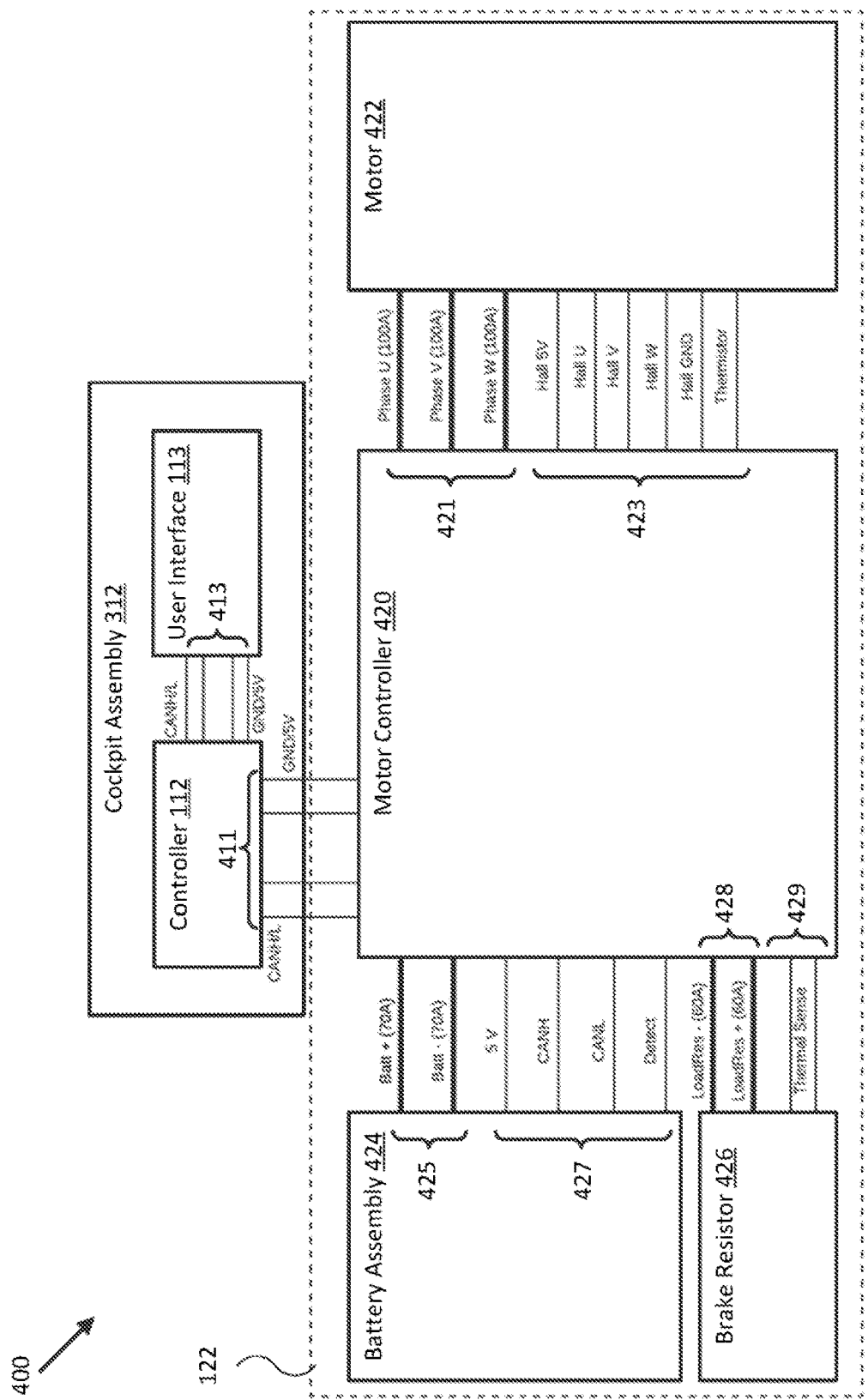
FIG. 4A illustrates a block circuit diagram of a propulsion control system for a micro-mobility fleet vehicle in accordance with an embodiment of the disclosure.

FIG. 4A illustrates a block circuit diagram of a propulsion control system 400 for a micro-mobility fleet vehicle in accordance with an embodiment of the disclosure. As shown in FIG. 4A, propulsion control system 400 may include propulsion system 122 configured to provide motive power for general operation of a micro-mobility fleet vehicle (e.g. one of micro-mobility fleet vehicles 110b-d) based on control data provided by controller 112 and/or user interface 113 over data buses 411 and/or 413, which may in some embodiments be integrated within cockpit assembly 312. In various embodiments, propulsion system 122 may include motor controller 420 coupled between electrical motor 422 (e.g., via power bus 421 and data bus 423), modular battery assembly 424 (e.g., via power bus 425 and data bus 427), brake resistor 426 (e.g., via power bus 428 and sensor/data bus 429), and elements of cockpit assembly 312 (e.g., via data bus 411).

Motor controller 420 may be configured to receive control data (e.g., throttle position, brake position, brake pressure, and/or other control data, which may be generated based on user input provided to user interface 113 and/or sourced directly from a fleet manager/servicer via management system 240) and provide power sourced from modular battery assembly 424 to motor 422 (e.g., to control acceleration of a micro-mobility fleet vehicle), provide power sourced from motor 422 to modular battery assembly 424 (e.g., for regeneration charging) and/or brake resistor 426 (e.g., to control electrical braking of a micro-mobility fleet vehicle), and/or to otherwise control operation of propulsion control system 122 and/or mediate operation of propulsion control system 400. Electrical motor 422 may be configured to provide motive power for a micro-mobility fleet vehicle (e.g., tractive power to rear wheel 322 of micro-mobility fleet vehicle 110b) and to provide motor monitoring data to motor controller 420, which may use such monitoring data to control operation of motor 422 and/or other elements of propulsion system 122, for example, and/or provide such monitoring information over the various data buses for monitoring, storage, and/or reporting, as described herein. Brake resistor 426 may be configured to provide braking power for a micro-mobility fleet vehicle (e.g., braking power extracted as electrical power generated by rear wheel 322 of micro-mobility fleet vehicle 110b) and to provide brake resistor monitoring data and/or corresponding sensor signals to motor controller 420, which may use such monitoring data to control operation of motor 422 and/or other elements of propulsion system 122, for example, and/or provide such monitoring information over the various data buses for monitoring, storage, and/or reporting.

Modular battery assembly 424 may be configured to provide electrical power to various elements of a micro-mobility fleet vehicle (e.g., elements of fleet vehicle 110 in FIG. 1) and to provide battery monitoring data to motor controller 420, which may use such monitoring data to control operation of motor 422, modular battery assembly 424, and/or other elements of propulsion system 122, for example, and/or provide such monitoring information over the various data buses for monitoring, storage, and/or reporting, as described herein. In some embodiments, data bus 427 of modular battery assembly 424 may include or provide a relatively low voltage bus voltage source configured to power the various data and/or sensor buses of propulsion system 122 and/or associated with elements of fleet vehicle 110.

In various embodiments, modular battery assembly 424 may be integrated with a memory or data storage interface and/or device, for example, and may be configured to receive all available monitoring data and/or vehicle status data (e.g., over data bus 427) and monitor, store, and/or report such data, such as to or via various elements of fleet vehicle 110, as described herein. In general, power buses 421, 425, and 428 may be implemented by relatively large gauge wiring harnesses coupled between modular battery assembly 424, motor controller 420, motor 422, and brake resistor 426, and data buses 411, 413, 423, 427, and 429 may be implemented by relative small gauge wiring harnesses coupled between the various elements of propulsion control system 400. In some embodiments, data and power buses may be integrated within a single wiring harness. In related embodiments, the various data buses may be implemented according to a distributed vehicle data bus, such as a Controller Area Network (CAN) bus. In other embodiments, any one or combination of the various data buses may be implemented wirelessly, such as by employing embodiments of wireless communications module 120 of FIG. 1.

Figure 4B:
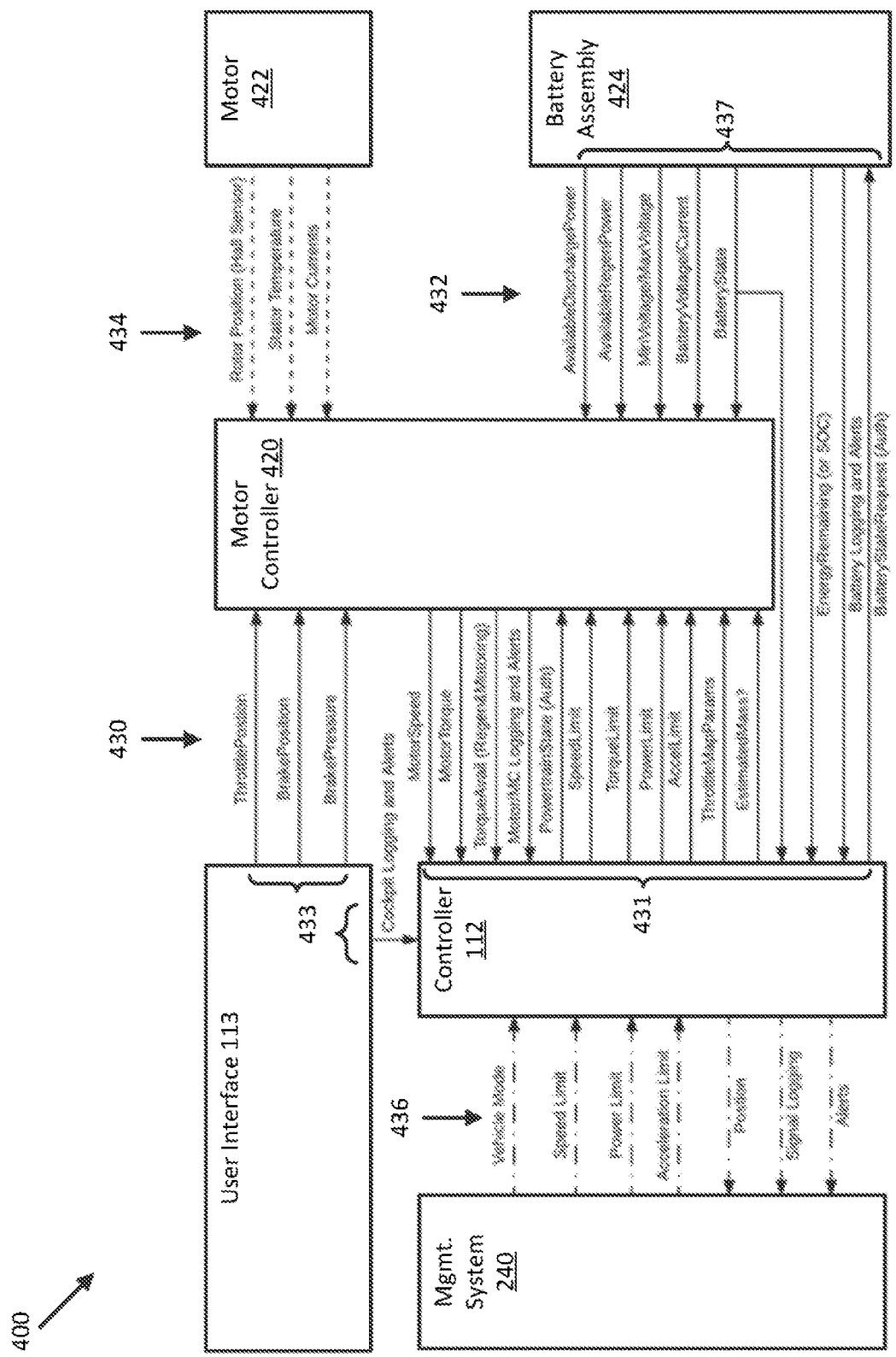
FIG. 4B illustrates a block data flow diagram of a propulsion control system for a micro-mobility fleet vehicle in accordance with an embodiment of the disclosure.

FIG. 4B illustrates a block data flow diagram for propulsion control system 400 for a micro-mobility fleet vehicle in accordance with an embodiment of the disclosure. As shown in FIG. 4B, propulsion control system 400 may implement vehicle data links 430 and 432, vehicle sensor and/or data links 434, and fleet data links 436 between the various elements of propulsion control system 400. In a specific embodiment, vehicle data links 430 and 432 may be formed over a CAN bus, vehicle sensor and/or data links 434 may be formed over a physically separate sensor and/or data signaling bus, and fleet data links 436 may be formed over one or more wireless data communication links (e.g., via a mesh, LAN, WAN, cellular, and/or combination of networks) to management system 240. In general, modular battery assembly 424 may be configured to provide battery assembly monitoring data 437 to, and/or receive monitoring and/or control data from, motor controller 420 and/or controller 112 over vehicle data links 430 and 432; controller 112 may be configured to receive and provide propulsion system monitoring and control data 431 among motor controller 420 and modular battery assembly 424 over vehicle data links 430, for example, and to communicate such monitoring and control data with management system 240 via fleet data links 436; and user interface 113 may be configured to receive and/or provide vehicle control data 433 over vehicle data links 430, as shown.

Figure 4C:
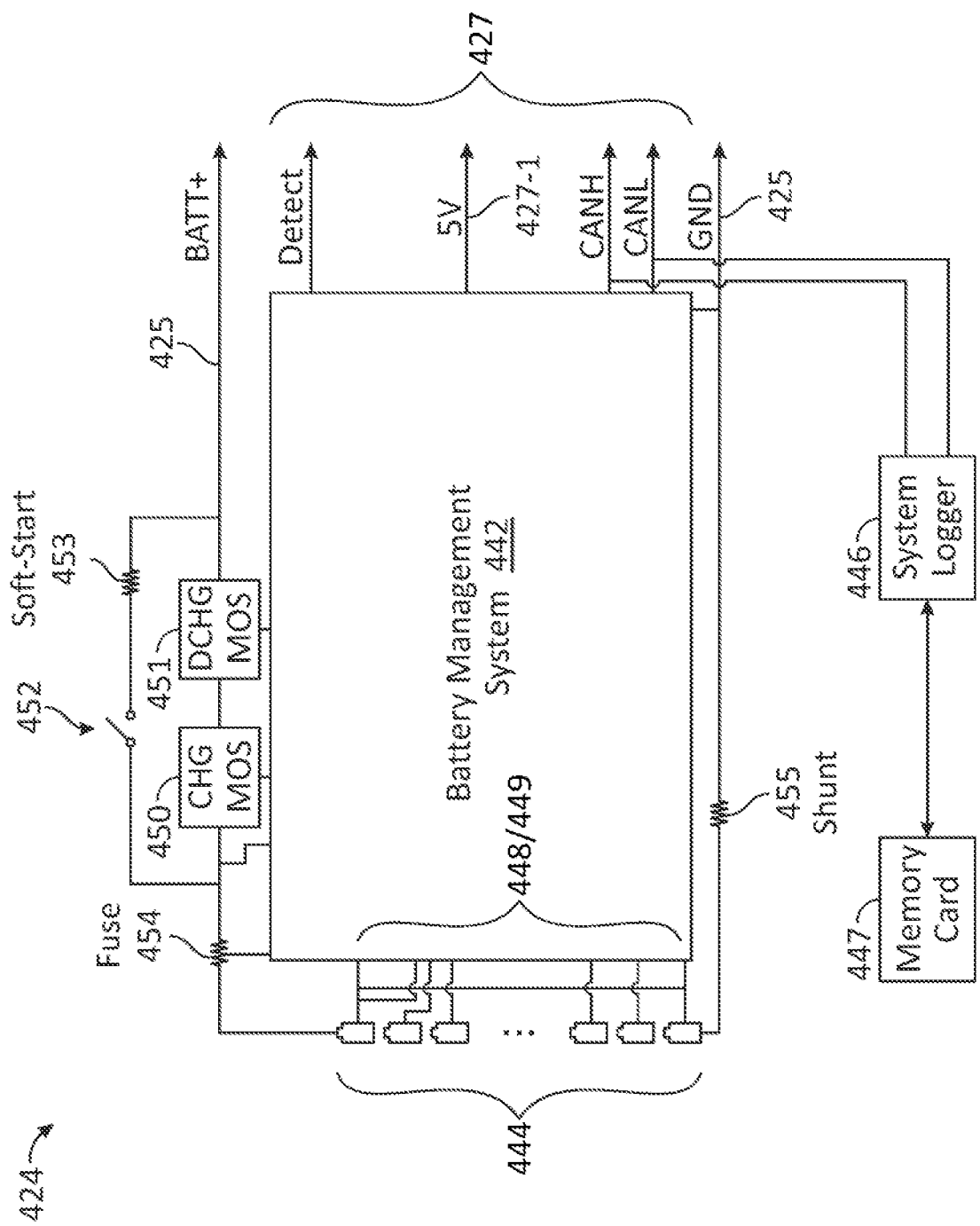
FIG. 4C illustrates a block circuit diagram of a modular battery assembly for a micro-mobility fleet vehicle in accordance with an embodiment of the disclosure.

FIG. 4C illustrates a block circuit diagram of modular battery assembly 424 for a micro-mobility fleet vehicle in accordance with an embodiment of the disclosure. As shown in FIG. 4C, modular battery assembly 424 may include battery management system 442 configured to monitor battery cells 444 and control operation of modular battery assembly 424, including charging, discharging, balancing, and overvoltage protection of battery cells 444; reporting proper installation of modular battery assembly 424 into a receiving micro-mobility fleet vehicle and/or charging station (e.g., an embodiment of docking station 300 of FIG. 3D); powering and/or monitoring vehicle data bus 427; and/or logging (monitoring, storing, reporting) monitoring and/or control data communicated over data bus 427. For example, battery management system 442 may be configured to provide control signals to metal-oxide-semiconductor field-effect transistor banks 450 and/or 451 to discharge battery cells 444 and provide power over power bus 425 or to charge battery cells 444 and receive power over power bus 425; to control operation of switch 452 to provide for a soft start of motor 422; to detect an overvoltage condition or thermal excursion of battery cells 444 (via balance leads 448, monitoring leads 449, and/or other monitoring leads within modular battery assembly 424) and open programmable fuse 454 to mitigate damage to battery cells 444 and/or other elements of modular battery assembly 424 and/or propulsion system 122 otherwise caused by such overvoltage condition or thermal excursion; to monitor data bus 427 for control data directing operation of modular battery assembly 424; to provide battery monitoring data over data bus 427, which may include providing battery monitoring data and/or other vehicle data to system logger 446 for monitoring and/or storage to memory/data storage device/interface 447, for example, or retrieving such stored data from memory 447 and/or system logger 446 for subsequent reporting over data bus 427. In some embodiments, battery management system 442 may be configured to generate bus source voltage 427-1 for data bus 427 (e.g., drawn from and/or DC to DC converted from power provided by battery cells 444), which may be distributed across all data busses and/or provided to any one or combination of elements of propulsion control system 400 and/or fleet vehicle 110.

In general, battery management system 442 and/or system logger 446 may be implemented by any one or combination of logic devices, similar in function and implementation to controller 112 and/or other elements of fleet vehicle 110 of FIG. 1. Memory 447 may be implemented as a permanent or removable data storage device, such as any readable, write-once, and/or rewriteable memory card. In some embodiments, battery management system 442, system logger 446, memory 447, and/or other elements of modular battery assembly 424 depicted in the circuit diagram of FIG. 4C, aside from battery cells 444, may be integrated into a monolithic printed circuit board (PCB), which may include multiple traces, interfaces, integrated circuits, and/or other devices selected and coupled to each other to perform the functions described with respect to the various elements of the circuit diagram depicted by FIG. 4C.

Battery cells 444 may be implemented by a plurality of rechargeable electrical power storage cells, for example, such as 21700-sized lithium-based rechargeable battery cells. In some embodiments, battery cells 444 may include a single ended battery cell, where both the positive and negative terminals are disposed at the same end of the battery cell (e.g., a central cap terminal, and a perimeter shoulder terminal), as described herein. Shunt 455 may be implemented as a diode to ensure current flows along power bus 425 only in a desire direction, for example, or may be implemented as any other shunt device or current monitoring device or component of such device.

Figure 4D:
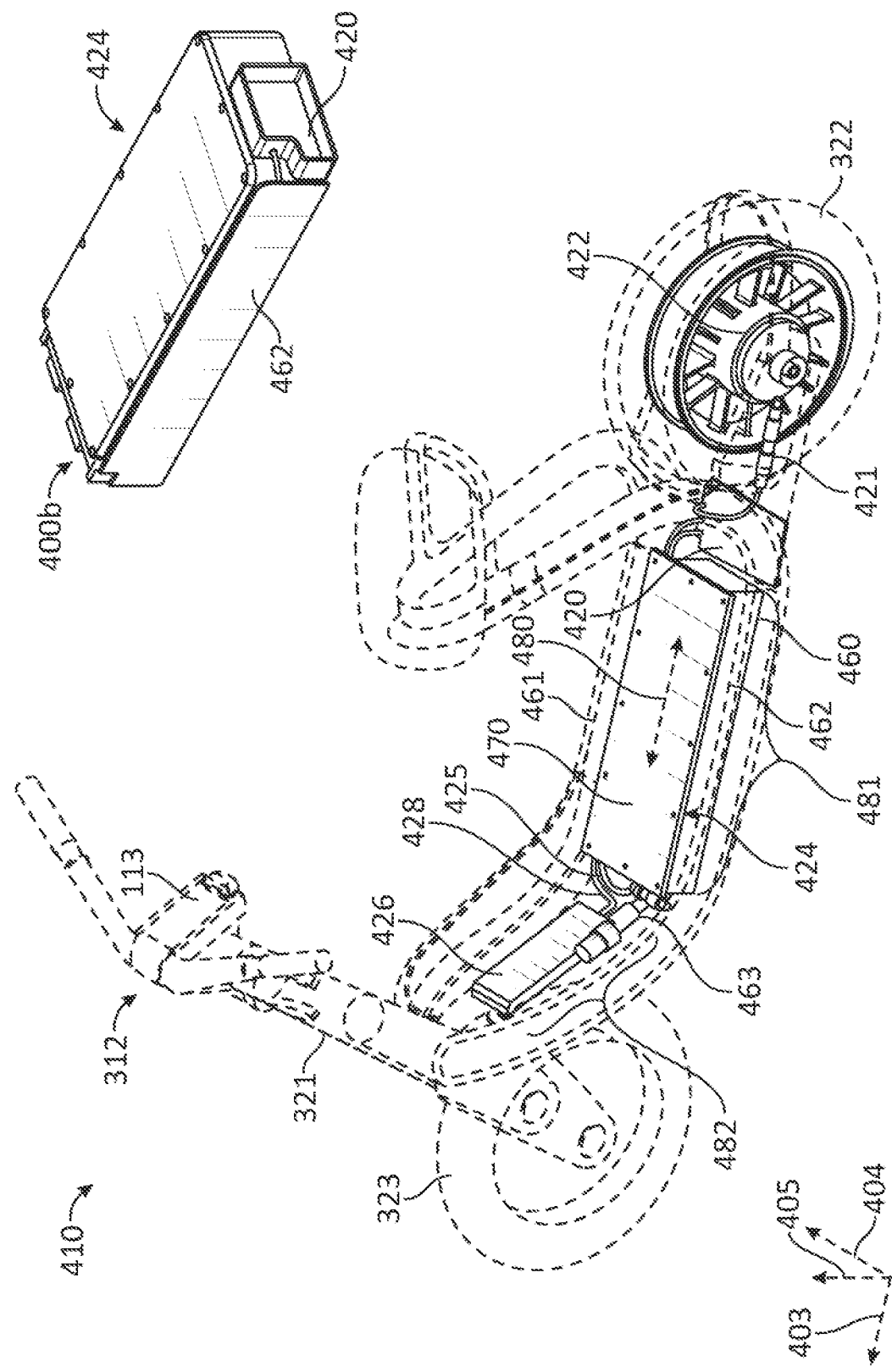
FIG. 4D illustrates a diagram of a micro-mobility fleet vehicle including a modular battery assembly in accordance with an embodiment of the disclosure.

FIG. 4D illustrates a diagram of a micro-mobility fleet vehicle 410 (e.g., a sit-scooter) including elements of propulsion control system 400 and including modular battery assembly 424 in accordance with an embodiment of the disclosure. As shown in FIG. 4D, micro-mobility fleet vehicle 410 may include modular battery assembly 424 coupled to a subframe assembly 462 of micro-mobility fleet vehicle 410. In the embodiment shown in FIG. 4D, subframe assembly 462 may be implemented as an aluminum subframe case disposed between and/or welded/coupled to left tubular frame member 460 and right tubular frame member 461, such that a long axis 480 of modular battery assembly 424 is substantially parallel to a longitudinal axis 403 of micro-mobility fleet vehicle 410 when modular battery assembly 424 is properly secured to subframe assembly 462. Longitudinal axis 403 is parallel to the general direction of travel in the frame of reference of micro-mobility fleet vehicle 410 and is perpendicular to a lateral axis 404 of micro-mobility fleet vehicle 410 (e.g., which is parallel to the rotational axis of rear wheel 322) and to a vertical axis 405 of micro-mobility fleet vehicle 410 (e.g., which is generally antiparallel to the gravitation vector when micro-mobility fleet vehicle 410 is driven upright on a level flat surface).

In the embodiment depicted by FIG. 4D, left tubular frame member 460 and right tubular frame member 461 may extend substantially longitudinally between front wheel 323 or steering column/head tube 321 and rear wheel 322 to form floorboard cavity 481, in which subframe assembly 462 is disposed, and font deck cavity 482, which may include a front deck pan or other structure disposed between tubular frame members 460 and 461 configured to support and/or enclose other elements of propulsion control system 122, including brake resistor 426 and/or battery assembly retention mechanism 463. Floorboard cavity 481 and/or front deck cavity 482 may also contain power buses 425 and 428, motor controller 420, and power bus 421 between motor controller 420 and motor 422 (e.g., which may be integrated with rear wheel 322 as shown). In various embodiments, one or more of power buses 421, 425, and 428, motor controller 420, subframe assembly 462, battery assembly retention mechanism 463, and/or brake resistor 426 may be mounted to and/or supported by subframe assembly 462, such as between subframe assembly 462 and one or both tubular frame members 460 and 461. For example, as shown in the inset diagram of power control system 400b, subframe assembly 462 may be implemented as a subframe case configured to receive and at least partially enclose modular battery assembly 424 and power bus 425 extending between modular battery assembly 424 and motor controller 420 mounted to a rear facing panel of subframe assembly 462, as shown. In some embodiments, one or more of power buses 421, 425, and 428 and motor controller 420 may be mounted to or within (e.g., integrated with) modular battery assembly 424.

As described herein, cockpit assembly 312, which may include user interface 113, may be electronically coupled to other elements of propulsion control system 400 via one or more data buses, including a data bus wire harness extending through head tube 321 and one or both of tubular frame members 460 and 461 to motor controller 420, for example. In various embodiments, such data bus wire harness may be at least partially integrated with a wire harness implementing any one of power buses 421, 425, and 428.

Figure 5B:
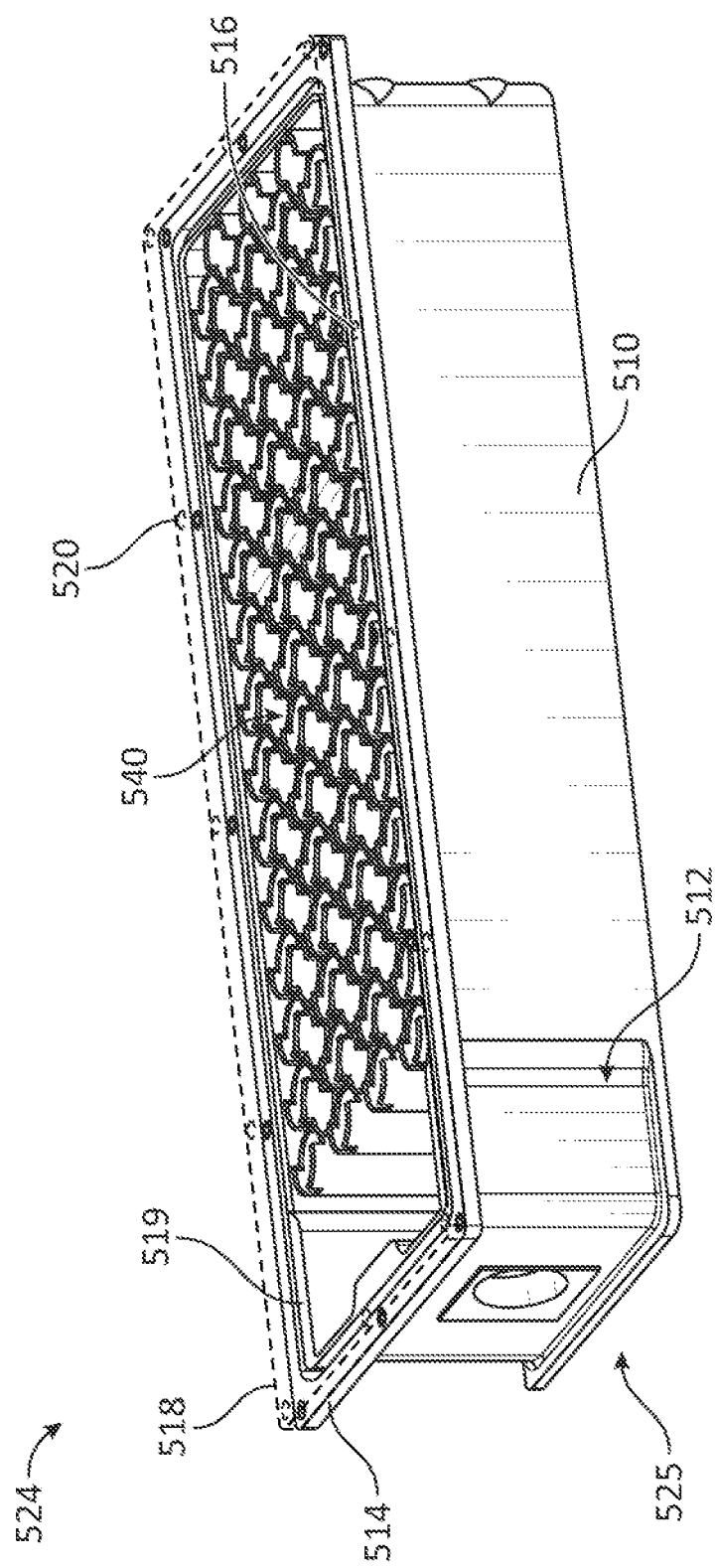

FIGS. 5A-B illustrate various aspects of a modular battery assembly 524 for a micro-mobility fleet vehicle (e.g., micro-mobility fleet vehicle 410) in accordance with embodiments of the disclosure. As shown in the exploded view of modular battery assembly 524 presented in FIG. 5A, modular battery assembly 524 may include a rectangular cuboid shaped battery assembly enclosure 510 and an enclosure lid 518 configured to form a sealed housing for battery cell assembly 540. Battery assembly enclosure 510 may be formed from a thermally conductive material, such as aluminum or a thermally conductive/impregnated resin, for example, and may include enclosure cavity 517, interface mounting orifice 511, battery assembly retention interface 512 (e.g., a head or tail assembly retention interface, depending on an orientation of an associated subframe assembly within micro-mobility fleet vehicle 410), and various other features configured to help physically secure and/or seal battery cell assembly 540 within enclosure cavity 517, such as seal groove 515 in enclosure lip 514, threaded fastener holes 516 formed through enclosure lip 514, and positioning ribs 513 within enclosure cavity 517. Battery assembly electrical interface 525 (e.g., a hermetic power/data bus interface) may be mounted within interface mounting orifice 511, for example, and may support leads for power bus 425 and/or data bus 427, which may be integrated into a single wire harness/bus 527. In some embodiments, battery management system 442 may be housed within battery assembly enclosure 510, such as between battery cell assembly 540 and interface mounting orifice 511. Enclosure lid 518 may be formed from a similar material, for example, and may include fastener through holes 520 configured to allow fasteners (e.g., screws) to fasten enclosure lid 518 to battery assembly enclosure 510 and compress lid seal 519 within seal groove 515 to form a watertight seal about battery cell assembly 540 within enclosure cavity 517.

In various embodiments, battery cell assembly 540 may include battery cell holder 530 and battery cells 444, where battery cell holder 530 is formed from a thermally insulating and/or flame resistant material and includes a packed array of battery cell shaped cavities configured to secure battery cells 444 (e.g., by press fit within each individual cell cavity) and provide a desired spacing and relative orientation between each individual cell and its neighbors. In some embodiments, battery cell holder 530 may include various features configured to help physically secure battery cell assembly 540 within enclosure cavity 517, such as mating surfaces configured to mate with positioning ribs 513 or a bottom surface of enclosure cavity 517.

FIG. 5B presents an assembled view of modular battery assembly 524, with enclosure lid 518 fastened to and sealing battery cell assembly 540 within enclosure cavity 517 (e.g., using fasteners threaded through fastener through holes 520 and into threaded fastener holes 516 to compress lid seal 519 within seal groove 515). In the embodiment shown in FIG. 5B, battery assembly retention interface 512 is implemented as a hinge receiver recess, and battery assembly retention interface 512 and battery assembly electrical interface 525 may be configured to mate with a corresponding hinge guide to hinge into a secured position within a subframe assembly, as described more fully herein with respect to FIGS. 7A-E.

FIGS. 6A-J illustrate various aspects of modular battery assembly 624 for a micro-mobility fleet vehicle (e.g., micro-mobility fleet vehicle 410) in accordance with embodiments of the disclosure. As shown in the exploded view of modular battery assembly 624 presented in FIG. 6A, modular battery assembly 624 may include a rectangular cuboid shaped battery assembly enclosure 610 and an enclosure lid 618 configured to form a sealed housing for a battery cell assembly 640. Battery assembly enclosure 610 may be formed from a thermally conductive material, such as aluminum or a thermally conductive/impregnated resin, for example, and may include enclosure cavity 517, battery assembly retention interfaces 612 and/or 613 (e.g., head or tail assembly retention interfaces, depending on an orientation of an associated subframe assembly within micro-mobility fleet vehicle 410), assembly handle 617, battery assembly electrical interface 625, and various other features configured to help physically secure and/or seal battery cell assembly 640 within enclosure cavity 517. Battery assembly electrical interface 525 (e.g., a hermetic power/data bus interface) may be mounted to or through battery assembly enclosure 610, for example, and may support leads for power bus 425 and/or data bus 427, which may be integrated into a single wire harness/bus, as described herein.

In some embodiments, battery management system 442 may be housed within battery assembly enclosure 610, such as mounted to battery cell assembly 640 between battery cell assembly 640 and battery assembly electrical interface 625, for example, or may be mounted externally to battery assembly enclosure 610, such as adjacent assembly handle 617 and/or assembly electrical interface 625. Enclosure lid 618 may be formed from a material similar to that used to form battery assembly enclosure 610, for example, and may include fastener through holes 620 configured to allow fasteners to fasten enclosure lid 618 to battery assembly enclosure 610 and compress a lid seal or other sealing mechanism and/or form a watertight seal about battery cell assembly 640 within enclosure cavity 517.

In various embodiments, battery cell assembly 640 may include honeycomb battery cell holder 630, battery cells 444, collector board 650, and cell assembly lid 622. Honeycomb battery cell holder 630 may be formed from a thermally insulating and/or flame resistant material and include a hexagonally packed array of hexagonal prism shaped battery cell cavities extending along a full length of each battery cell 444 and configured to secure battery cells 444 (e.g., by press fit within each individual cell cavity) and provide a desired spacing and relative orientation between each individual cell and its neighbors. In addition, battery cell holder 630 may include a collector board tray 631 configured to support and/or position collector board 652 above battery cells 444 after they are press fit into honeycomb battery cell holder 630. In some embodiments, battery cell holder 630 may include various features configured to help physically secure battery cell assembly 640 within enclosure cavity 517, such as mating surfaces configured to mate with corresponding surfaces or a bottom surface of enclosure cavity 517, for example, or features configured to facilitate mounting of battery management system 442 (e.g., in the form of a monolithic PCB) to battery cell holder 630, to facilitate securing collector board 650 to collector board tray 631, and/or to facilitate mounting cell assembly lid 622 to collector board tray 631 and/or battery cell holder 630 over collector board 650.

Collector board 650 may be configured to interconnect each of battery cells 444 by wire bonding according to a desired output voltage, for example, and to provide corresponding output power to battery management system 442 (e.g., and power bus 425), such as through a high current-capable board to board connector (e.g., a thick pin connector/interface). As such, collector board 650 provides a significant reduction in internal wiring and accompanying routing clutter. Each wire bond may be formed (e.g., using a selected thickness of wire bond wire and/or wire bonding pressure, duration, and/or other formation parameters) to act as an individual one-time fuse for each battery cell, such that if any cell attempts to pass too high a current (e.g., by shorting internally) and/or its terminals exceed a predetermined maximum operating temperature, the of 44 corresponding wire bond(s) will burn and/or open and isolate the faulty battery cell from the rest of battery cells 444.

In various embodiments, collector board 650 may be implemented as a PCB including a number of board pads exposed at a top surface of collector board 650 and interconnected by cell balance traces or lines extending through and/or over collector board 650, an array of battery cell access through holes or wells each configured to provide physical access through collector board 650 to a top of an underlying battery cell that is sufficient for wire bonding both terminals of the battery cell to an adjacent wire bonding pad, and a collector board electrical interface 652 mounted at an edge of collector board 650 and electrically coupled to the wire bonding pads and/or the cell balance traces or lines extending through and/or over collector board 650. In some embodiments, collector board 650 may be mechanically secured to collector board tray 631 of honeycomb battery cell holder 630 by heat staking and/or adhesive. Cell assembly lid 622 may be configured to snap into place to collector board tray 631 over collector board 650 (e.g., secured by features formed in cell assembly lid 622 and/or collector board tray 631) in order to complete assembly of battery cell assembly 640 and protect system assemblers and wire bonds associated with collector board 650 and/or battery cells 444 from accidental contact.

Figure 6A:
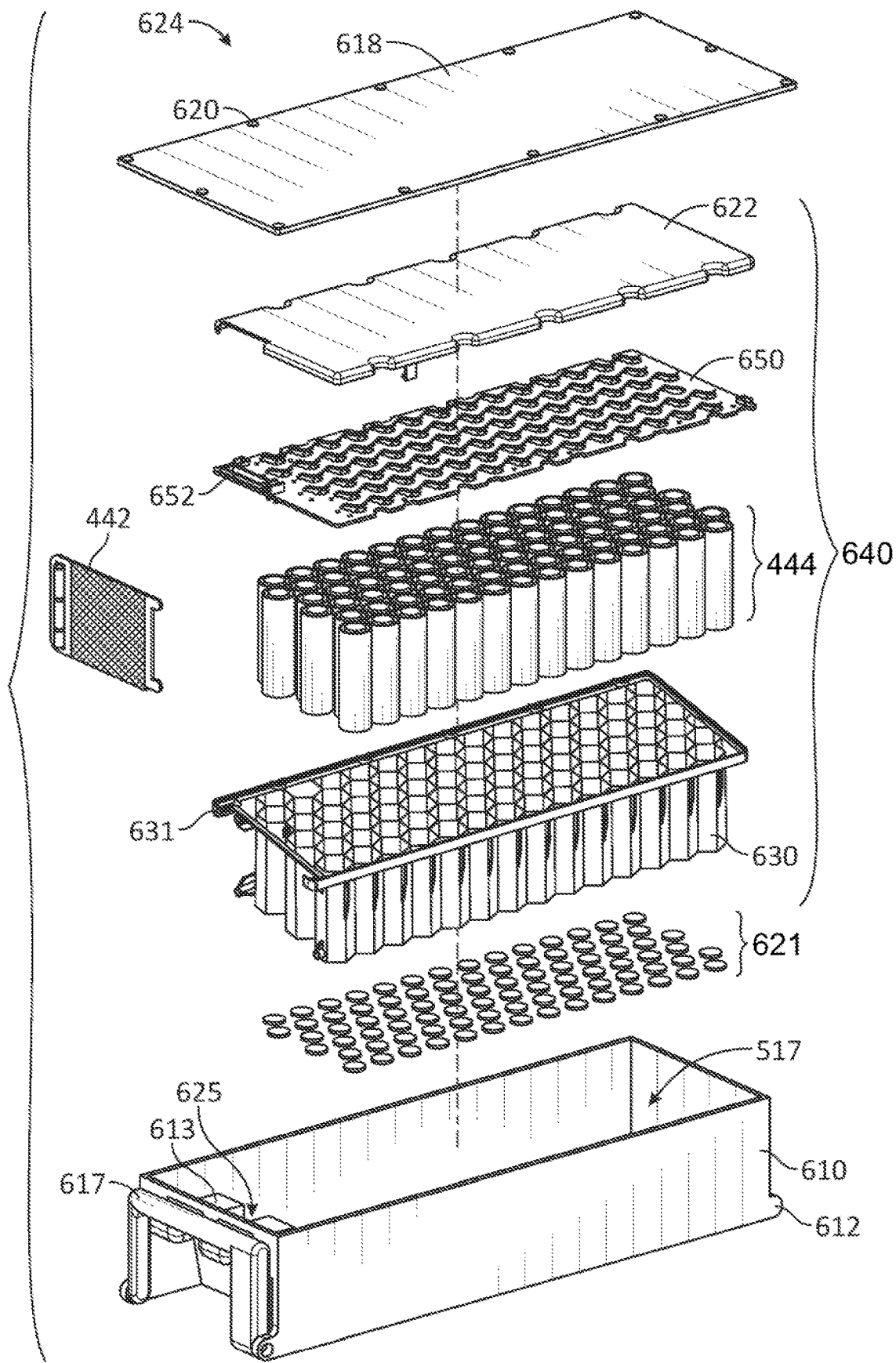

As shown in FIG. 6A, modular battery assembly 624 may include an array of thermal adhesive disks 621 each configured to extend from a bottom of enclosure cavity 517 through a similarly sized access hole at a bottom of a corresponding battery cell cavity of honeycomb battery cell holder 630 to contact and thermally couple and/or mechanically secure each battery cell to battery assembly enclosure 610. In some embodiments, thermal adhesive disks 621 may be formed from a material that is able to deform to facilitate contacting and/or thermally coupling each battery cell to battery assembly enclosure 610, such as being extrudable through the access hole up to and about a base of the battery cell when battery cell assembly 640 is placed and/or pressed into enclosure cavity 517.

Figure 6B:
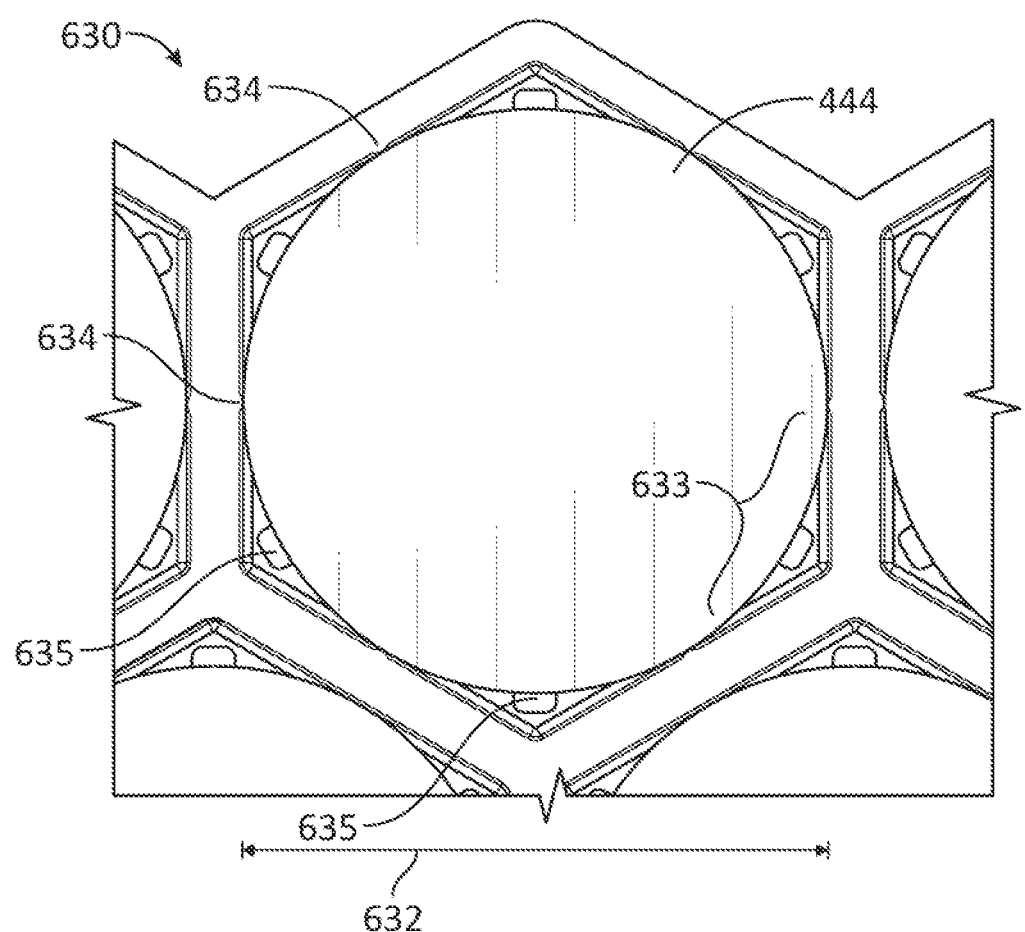

FIG. 6B presents a detailed top down view of an individual hexagonal prism shaped battery cell cavity 632 of honeycomb battery cell holder 630. In FIG. 6B, the hexagonal perimeter of battery cell cavity 632 forms six full length (e.g., cell length air gaps 633) that help thermally isolate adjacent battery cells from each other and provide space for venting in the event of a thermal overrun of an individual cell. In some embodiments, battery cell cavity 632 may include one or more crush ribs 634 disposed along a length of a surface of battery cell cavity 632, which may be configured to secure battery cell 444 in place but allow insertion by press fit. In particular embodiments, battery cell cavity 632 may include one or more bottom vents 635 (e.g., notches formed in corresponding bottom access holes) to allow a thermal adhesive disk 621 to enter or extrude through the bottom access hole into the bottom of battery cell cavity 632 to contact a bottom of battery cell 444 without being impeded by air pressure differentials, for example.

Figure 6C:
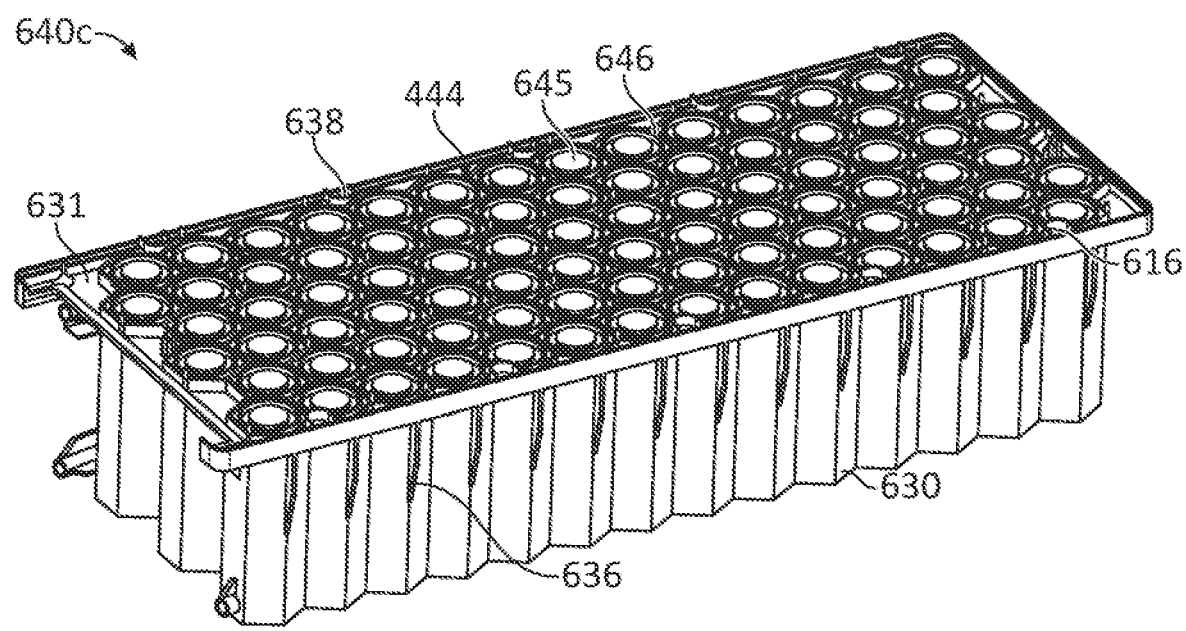

FIG. 6C presents a detailed orthographic view of battery cell subassembly 640c showing battery cells 444 press fit into battery cell cavities of honeycomb battery cell holder 630 so that a full length of each battery cell is encompassed by its corresponding battery cell cavity to provide increased thermal isolation properties, as described herein. In FIG. 6C, honeycomb battery cell holder 630 includes fastener holes 616, collector board tray 631, external alignment ribs 636 (e.g. to enclosure cavity 517), battery management system mounting features 637, collector board alignment features 638, and positive electrode/cell cap 645 and negative electrode/cell shoulder 646 of battery cells 444, which may be selectively wire bonded to collector board 650, as described herein.

Figure 6D:
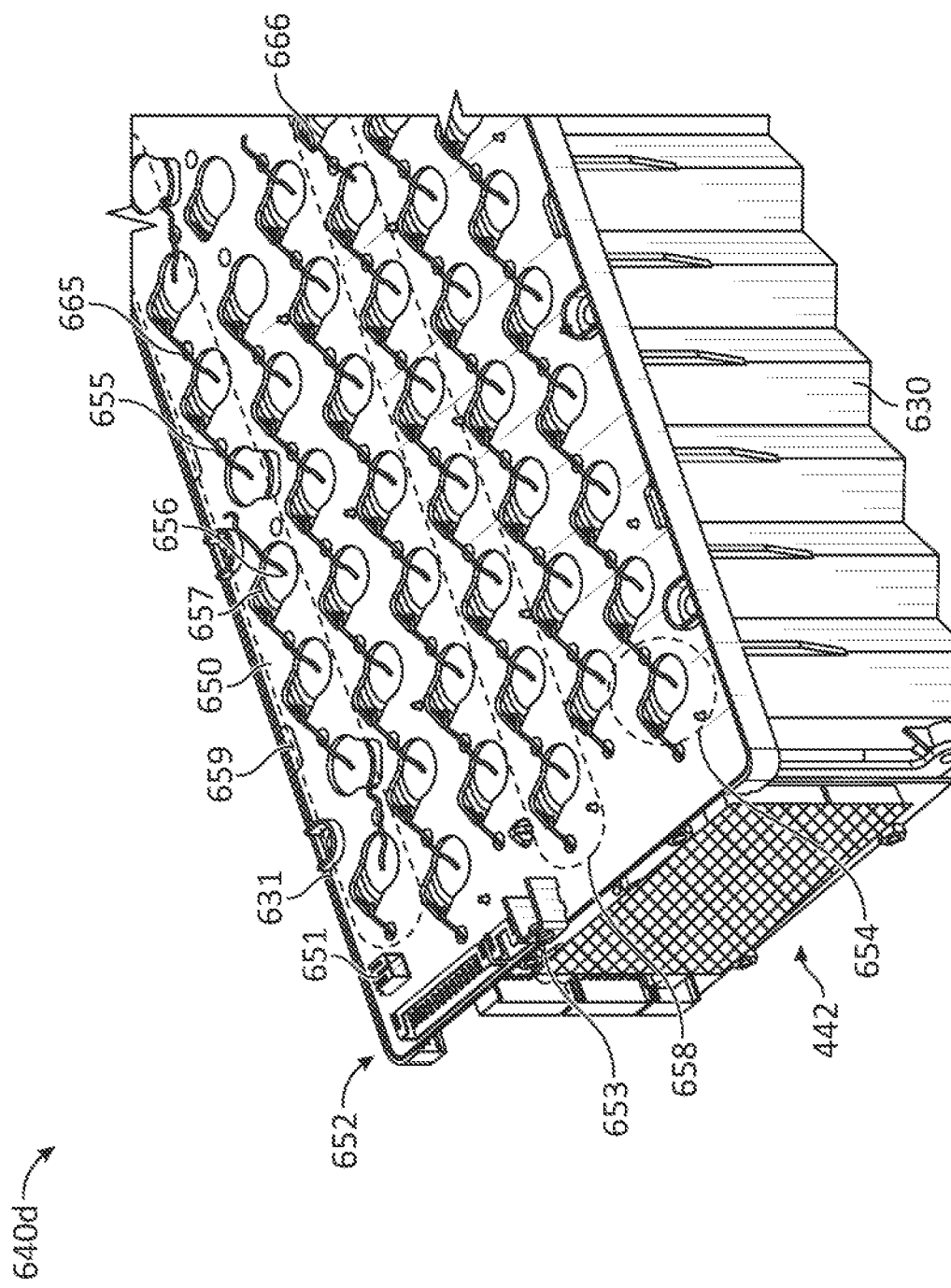

FIG. 6D presents a detailed orthographic view of battery cell subassembly 640d showing collector board 650 secured to collector board tray 631 of honeycomb battery cell holder 630 and wire bond pads 655 of collector board 650 wire bonded to select terminals of battery cells 444 in honeycomb battery cell holder 630 to provide a desired output voltage for modular battery assembly 624, as described herein. In the embodiment shown in FIG. 6D, collector board 650 includes a plurality of keyhole shaped cell access wells 654 arranged over corresponding battery cells 444 in multiple parallel serial arrays 658 each including a series of battery cells 444 coupled serially (e.g., positive terminal to negative terminal) by sections of wire bond wire 666 and cell cap wire bonds/welds 656, cell shoulder wire bonds/welds 657, and board pad wire bonds/welds 665 to board pads 655. As shown in FIG. 6D, some serial arrays (e.g., serial array 658) may include cell access wells 654 oriented similarly across the length of the array, and other serial arrays (e.g., serial array 658) may include cell access wells 654 oriented differently across the length of the array, such as to provide for physical clearance for collector board alignment features (e.g., collector board alignment features 638 in FIG. 6C). In some embodiments, collector board 650 may include collector board electrical interface 652, electrical interface 653 (e.g., a power bus interface or an insertion detect interface), and/or a thermal sensor interface 651 (e.g., sensor and/or data bus interface). For example, collector board 650 may include a number of thermal sensors configured to provide temperature monitoring data associated with individual battery cells and/or groups of battery cells, as described herein.

Figure 6E:
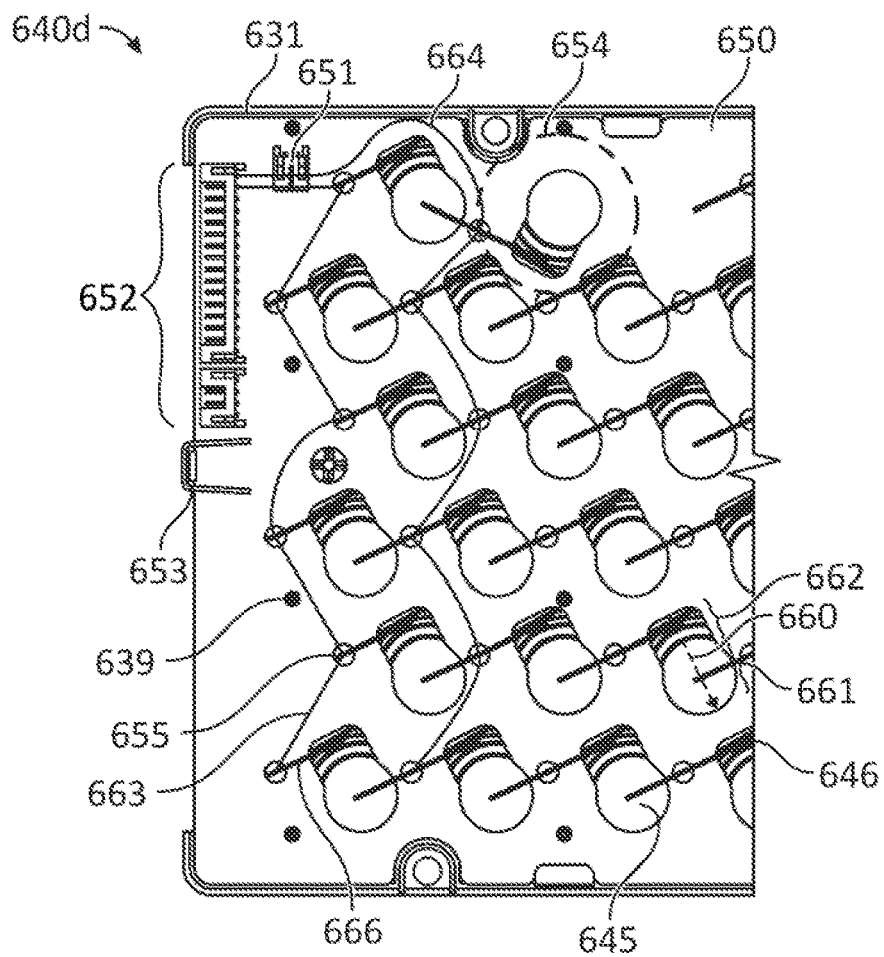

FIG. 6E presents a detailed top down view of battery cell subassembly 640d showing collector board 650 secured to collector board tray 631 of honeycomb battery cell holder 630 (e.g., via alignment features/head stakes 639) and an arrangement of wire bonds to select terminals of battery cells 444 through keyhole shaped cell access wells 654. In FIG. 6E, keyhole shaped cell access wells 654 each include a disk portion 661 configured to provide physical and/or wire bonding access to cell cap 645 and a notch portion (e.g., displaced from disk portion 661 along a long axis 660 of cell access well 654) configured to provide physical and/or wire bonding access to cell shoulder 646. Wire bond wire sections 666 can each be wire bonded to a cell cap 645, a board pad 655, and/or a cell shoulder 646, as shown, such that the wire bonds carry the current of constituent serial arrays (e.g., except at ends of the serial arrays, which may be coupled to power bus terminals/traces coupled to or embedded within collector board 650 and/or to collector board electrical interfaces 652 and/or 653. Also shown in FIG. 6E are balance lines 663 and 664, which may be coupled between board pads 655 and electrical interface 652 and/or embedded within collector board 650. As described herein, battery management system 442 may be configured to use balance lines 663 and 664 (e.g., similar to balance leads 448, monitoring leads 449 of FIG. 4C) to balance serial arrays of battery cells (e.g., balance charge among the various cell groups) of battery cell assembly 640.

Figure 6F:
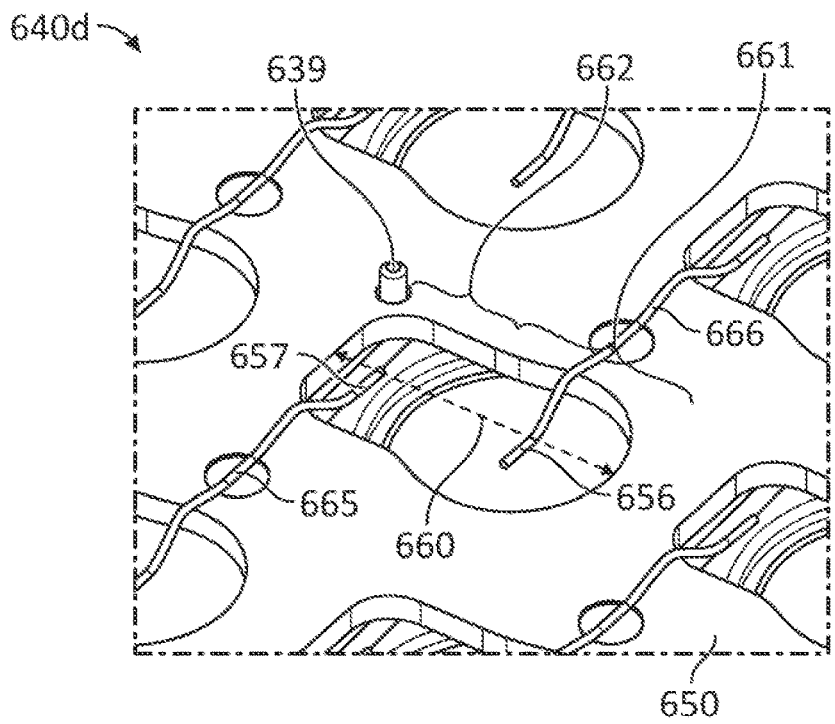

FIG. 6F presents a detailed orthographic view of battery cell subassembly 640d showing collector board 650 secured to collector board tray 631 of honeycomb battery cell holder 630 (e.g., via alignment features/head stakes 639) and an arrangement of wire bonds (e.g., sections of wire bond wire 666, cell cap wire bonds/welds 656, cell shoulder wire bonds/welds 657, and board pad wire bonds/welds 665 to board pads 655) to select terminals of battery cells 444 through a disk portion 661 of keyhole shaped cell access wells 654 and a notch portion 662 displaced from the disk portion along long axis 660 of keyhole shaped cell access wells 654.

Figure 6G:
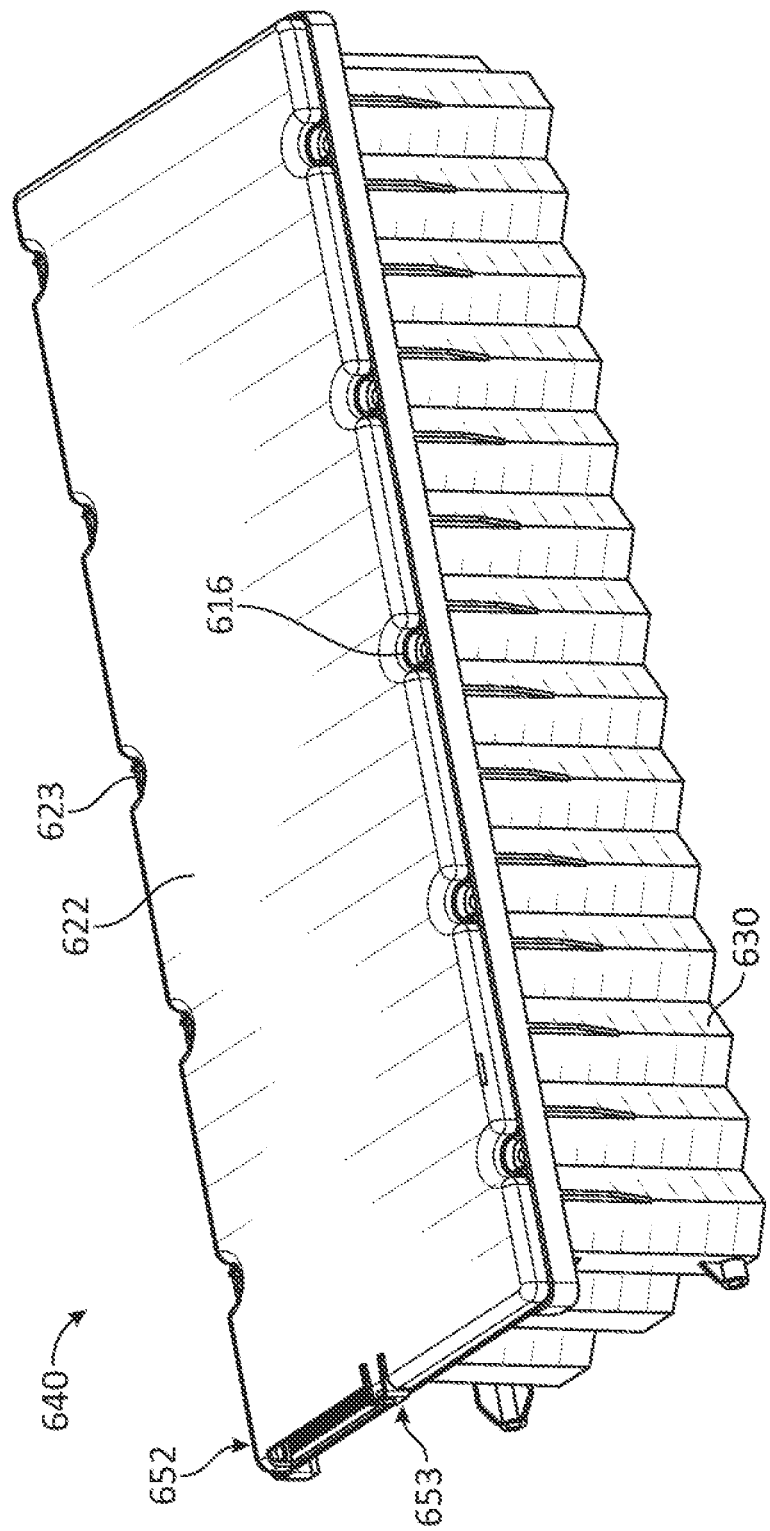
Figure 6H:
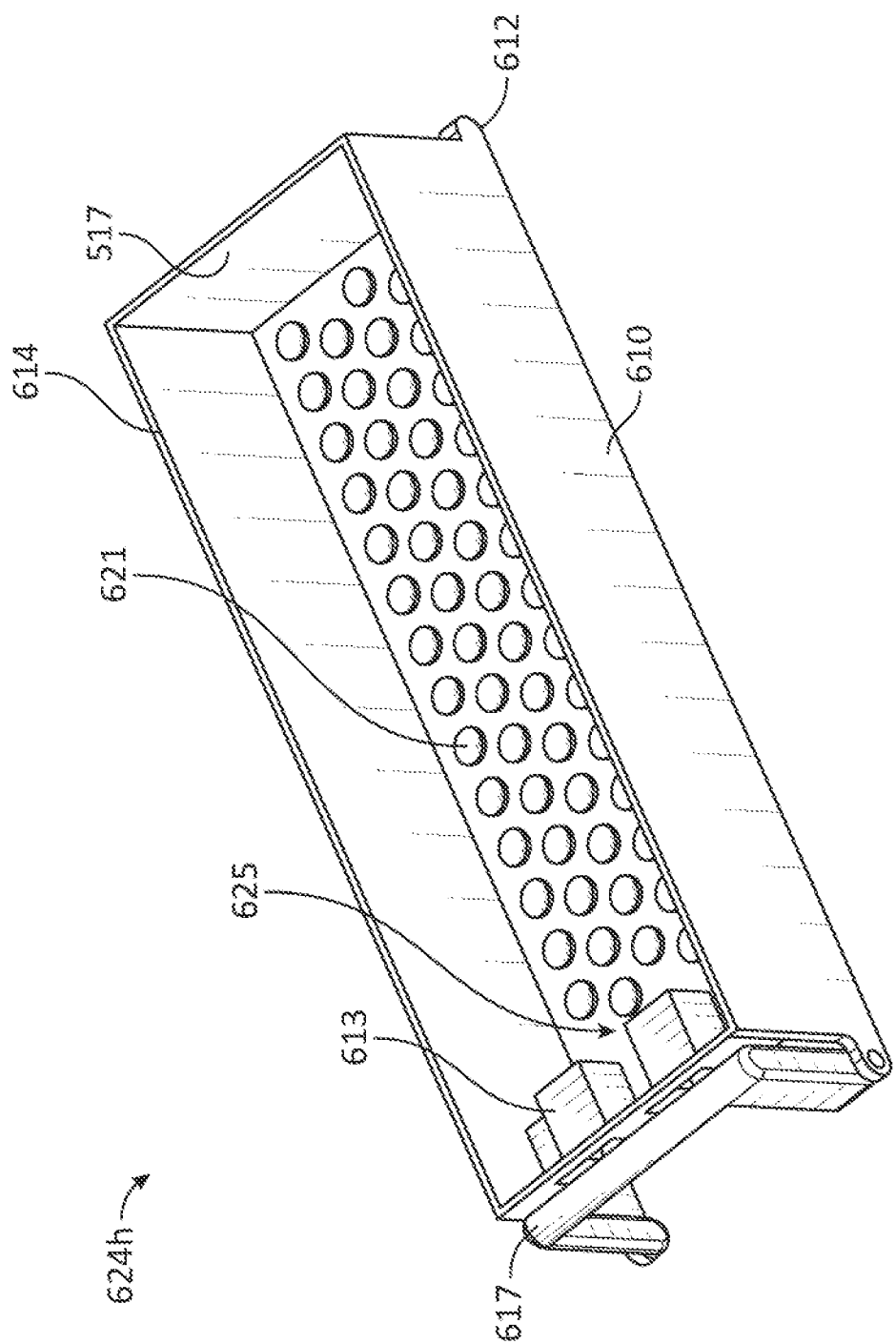
Figure 61:
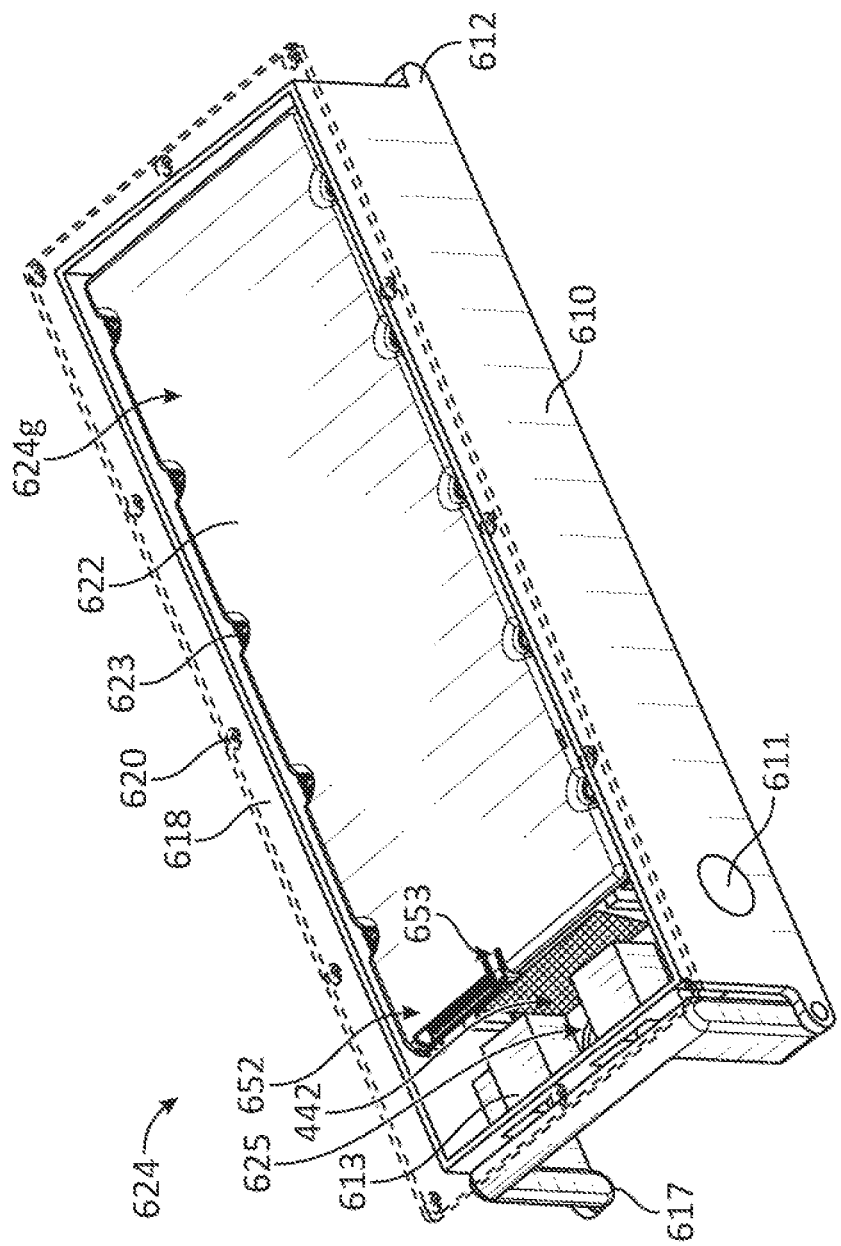

FIG. 6G presents a detailed orthographic view of battery cell assembly 640 showing cell assembly lid 622 fitted to battery cell subassembly 640d of FIG. 6D, where cell assembly lid 622 includes access notches 623 configured to align cell assembly lid 622 to honeycomb battery cell holder 630 and provide access to fastener holes 616, which may be used to secure battery cell assembly 640 to battery assembly enclosure 610. FIG. 6H presents a detailed orthographic view of modular battery subassembly 624h showing thermal adhesive disks 621 arranged along a bottom of enclosure cavity 517 to receive honeycomb battery cell holder 630 of battery cell assembly 640 and thermally and mechanically couple battery cells 444 embedded within battery cell holder 630 to battery assembly enclosure 610. Also shown is enclosure lip 614 configured to form a seal with enclosure lid 618, as described herein. FIG. 6I presents a detailed orthographic view of modular battery assembly 624 showing enclosure lid 618 coupled to battery assembly enclosure 610 to seal battery cell assembly 640 within the corresponding enclosure cavity 517, as described herein. Also shown are fastener through holes 620 of enclosure lid 618 configured to allow fasteners to fasten enclosure lid 618 to battery assembly enclosure 610 and liquid-waterproof breathable pressure relief patch 611 configured to allow pressurized air and/or contaminates to exit enclosure cavity 517 in the event of a cell rupture, thereby reducing the risk that pressure and contaminates caused by a cell rupture cause other battery cells in modular battery assembly 624 to rupture. In various embodiments, pressure relief patch 611 may be implemented, at least in part, by Gore-Tex fabric.

Figure 6J:
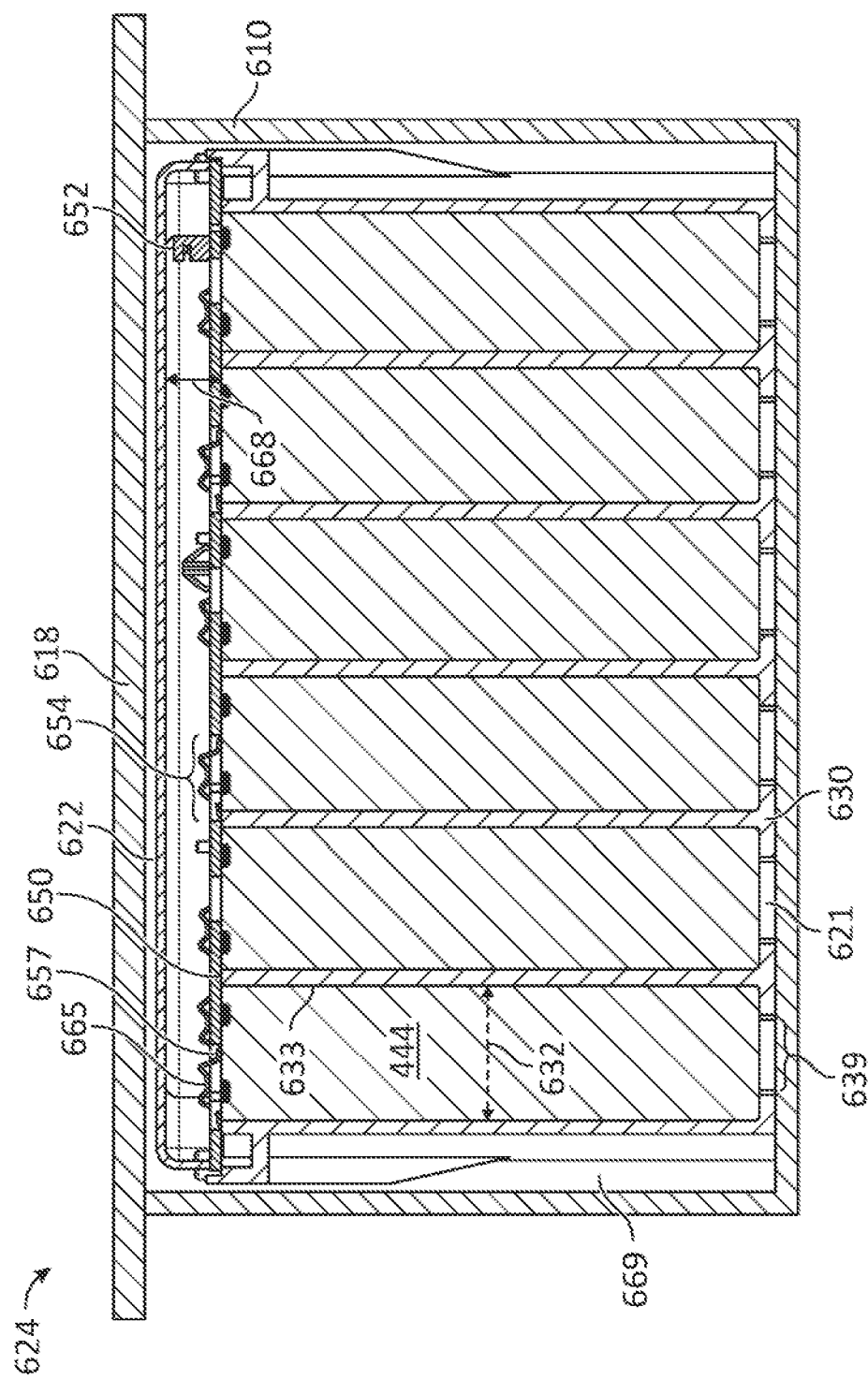

FIG. 6J presents a detailed cross section view of modular battery assembly 624 showing enclosure lid 618 coupled to battery assembly enclosure 610 to seal battery cell assembly 640 within the corresponding enclosure cavity 517, as described herein. Also shown in FIG. 6J are cell assembly lid 622 configured to provide head clearance 668 above collector board 650 for various wire bonds (e.g., board pad wire bonds 665, call cap wire bonds 657) and facilitating relatively low pressure venting access in the event of a cell rupture, to help prevent collateral ruptures, as described herein. In addition, FIG. 6J shows enclosure gap 669 between honeycomb battery cell holder 630 and battery assembly enclosure 610, which is also provided to help prevent collateral ruptures. As described herein, the hexagonal perimeter of each hexagonal prism shaped battery cell cavity 632 provides full length air gaps 633 about battery cells 444 for thermal isolation and rupture venting purposes, and each battery cell cavity 632 includes a bottom access hole allowing thermal adhesive disks 621 to contact and thermally couple a bottom of battery cell 444 to a bottom of battery assembly enclosure 610, so as to help reduce risk of thermal excursions in battery cells 444.

Figure 7A:
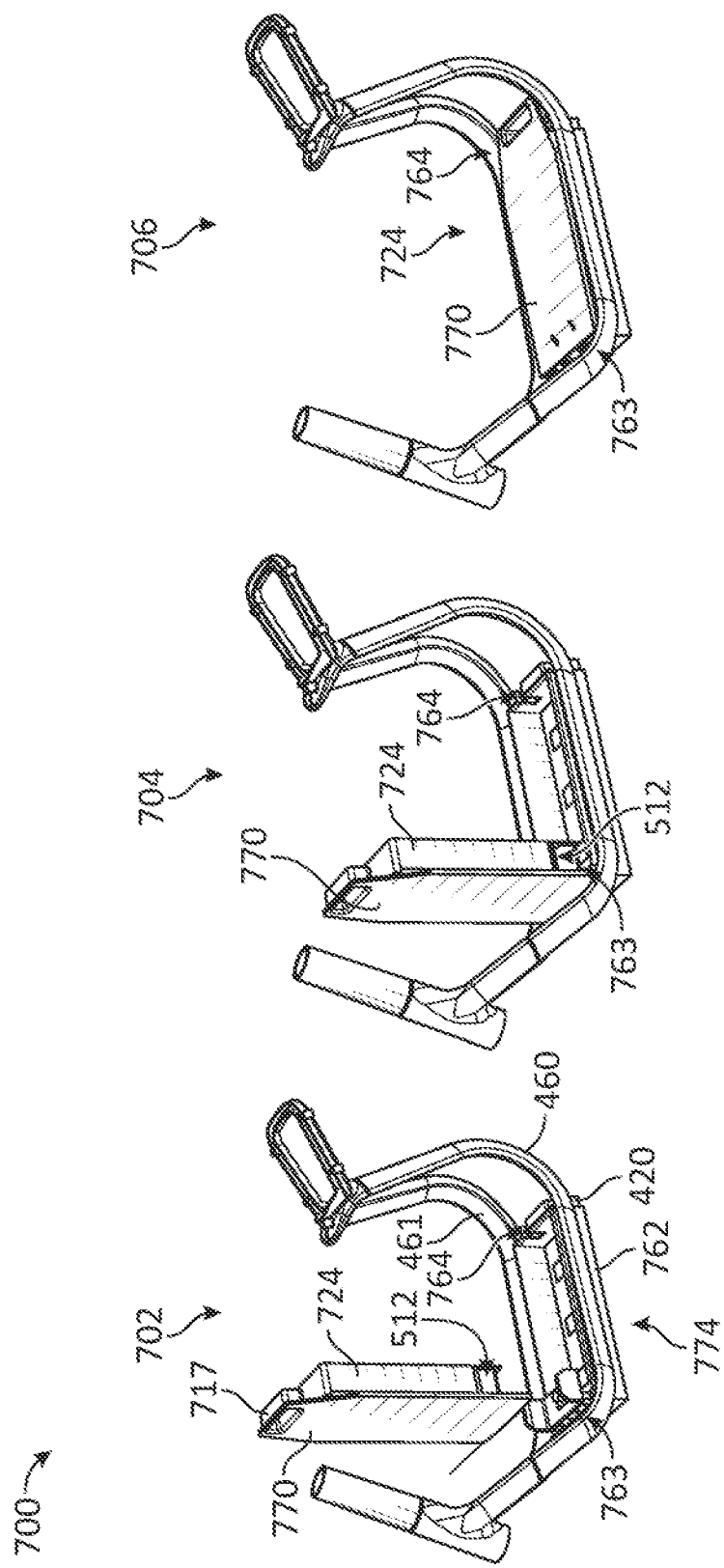

FIGS. 7A-E illustrate various aspects of a modular battery assembly 724 for a micro-mobility fleet vehicle (e.g., micro-mobility fleet vehicle 410) in accordance with embodiments of the disclosure. In particular, FIG. 7A shows three steps 702, 704, and 706 for installing modular battery assembly 724 into a subframe assembly 762 implemented as a subframe case coupled between tubular frame members 460 and 461 and including a hinged head assembly retention mechanism 763 (e.g., a hinged assembly retention mechanism disposed towards head tube 321 and/or a front of micro-mobility fleet vehicle 410). In the embodiment shown in FIG. 7A, motor controller 420 is mounted to rear external face of subframe assembly 762, and subframe assembly 762 includes a floorboard panel 774 providing a floorboard for micro-mobility fleet vehicle 410 configured to protect modular battery assembly 724 from road debris.

In step 702, a fleet servicer technician may use ergonomic battery assembly handle 717 to position modular battery assembly 724 over hinged assembly retention mechanism 763 with battery assembly retention interface 512 (e.g., a hinge receiver recess) generally spatially aligned with hinged assembly retention mechanism 763 (e.g., to align with a hinge guide and/or an electrical interface of hinged assembly retention mechanism 763), such that arched floorboard panel 770 is facing substantially towards head tube 321 and/or away from subframe assembly 762. In step 704, modular battery assembly 724 is lowered into hinged assembly retention mechanism 763 to mate battery assembly retention interface 512 with hinged assembly retention mechanism 763. In step 706, modular battery assembly 724 is pivoted into subframe assembly 762 via hinged assembly retention mechanism 763 and secured in place by tail assembly retention mechanism 764 (e.g., an assembly retention mechanism disposed towards rear wheel 322 and/or a rear of micro-mobility fleet vehicle 410). In alternative embodiments, a similar series of steps may be used to install modular battery assembly 724 into a subframe assembly implemented as a subframe case coupled between tubular frame members 460 and 461 and including a hinged tail assembly retention mechanism (e.g., a hinged assembly retention mechanism disposed towards rear wheel 322 and/ or a rear of micro-mobility fleet vehicle 410). Steps 702, 703, and 704 may generally be reversed to remove modular battery assembly 724 from subframe assembly 762.

FIG. 7B presents an exploded view of modular battery assembly 724 and subframe assembly 762 corresponding to step 702 of FIG. 7A. In FIG. 7B, modular battery assembly 724 includes features similar to those described with respect to FIGS. 5A-B, but with the addition of of 44 arched floorboard panel 770 with integrated ergonomic handle 717, insulator panels 721 and 722, and pawl 710 and pawl retention clip 711 of battery assembly enclosure 510. Insulator panels 721 and 722 may be formed from a ceramic material able to withstand relatively high temperatures associated with battery cell blowout/rupture, so as to protect a rider and/or micro-mobility fleet vehicle 410 from damage in the event of such rupture. Pawl 710 may be implemented as a latch or other component coupled to battery assembly enclosure 510 via pawl retention clip 711 and be configured to engage with tail assembly retention mechanism 764, where tail assembly retention mechanism 764 may be implemented as an electromechanical locking mechanism configured to lock modular battery assembly 724 in subframe assembly 762 until a fleet servicer provides an unlock code or signal to cockpit assembly 312, for example, or uses a proprietary mechanical tool to disengage tail assembly retention mechanism 764, release pawl 710, and pivot modular battery assembly 724 out of subframe assembly 762. Arched floorboard panel 770 may be formed from an impact modified plastic resin, for example, and may be configured to provide a floorboard surface for micro-mobility fleet vehicle 410. In various embodiments, arched floorboard panel 770 may form a structural component of micro-mobility fleet vehicle 410 and be configured to distribute a step weight of a rider of micro-mobility fleet vehicle 410 along subframe assembly 762 and/or tubular frame members 460 and 461, as described herein more fully with respect to FIGS. 9A-B.

Also shown in FIG. 7B is subframe assembly 762 including hinged assembly retention mechanism 763. For example, hinged assembly retention mechanism 763 may include hinge guide 790, subframe assembly electrical interface 725 configured to mate with battery assembly electrical interface 525, torsion springs 791, pivot shaft 792, and pivot cylinder 793, which may be configured to receive and/or mate with battery assembly retention interface 512 of modular battery assembly 724 and pivot about pivot shaft 792 to place modular battery assembly 724 within subframe assembly 762, for example, and to allow pawl 910 to engage with tail assembly retention mechanism 764. In some embodiments, subframe assembly 762 may include a wiring channel configured to route power bus 425 from subframe assembly electrical interface 725 to motor controller 420, as described herein.

Figure 7C:
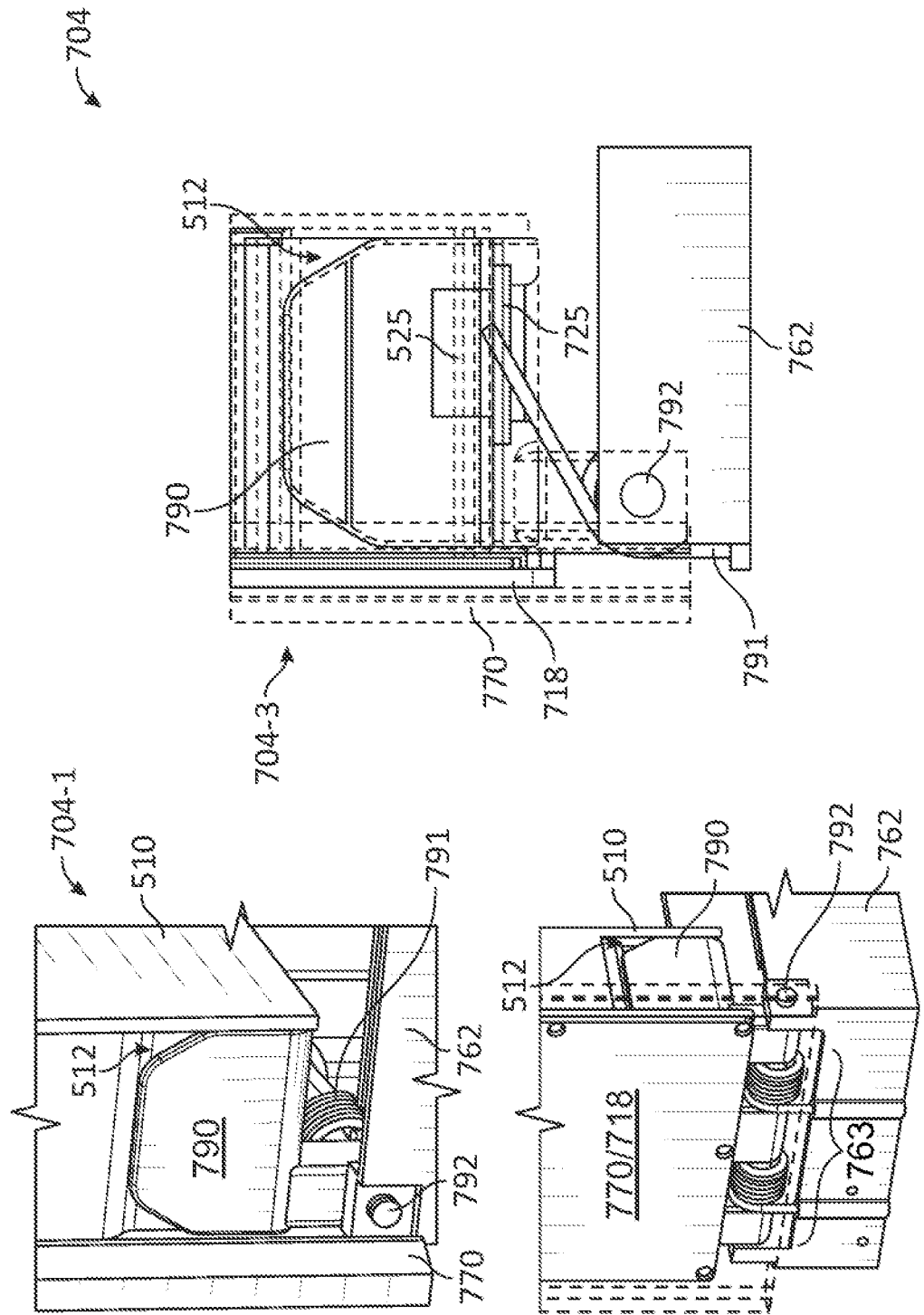

FIG. 7C presents various views of modular battery assembly 724 engaged with hinged assembly retention mechanism 763 of subframe assembly 762, as shown in step 704 of FIG. 7A. In FIG. 7C, side view 704-1 shows an assembled hinged assembly retention mechanism 763 including hinge guide 790, torsion springs 791, and pivot shaft 792 mechanically coupling assembly retention interface 512 of modular battery assembly 724 to hinged assembly retention mechanism 763 of subframe assembly 762, with arched floorboard panel 770 oriented towards a front of micro-mobility fleet vehicle 410. Front left view 704-2 shows a different perspective of the elements identified in view 704-1. Partial wireframe side view 704-3 battery assembly electrical interface 525 mated with subframe assembly electrical interface while assembly retention interface 512 of modular battery assembly 724 is coupled to hinged assembly retention mechanism 763 of subframe assembly 762.

Figure 7D:
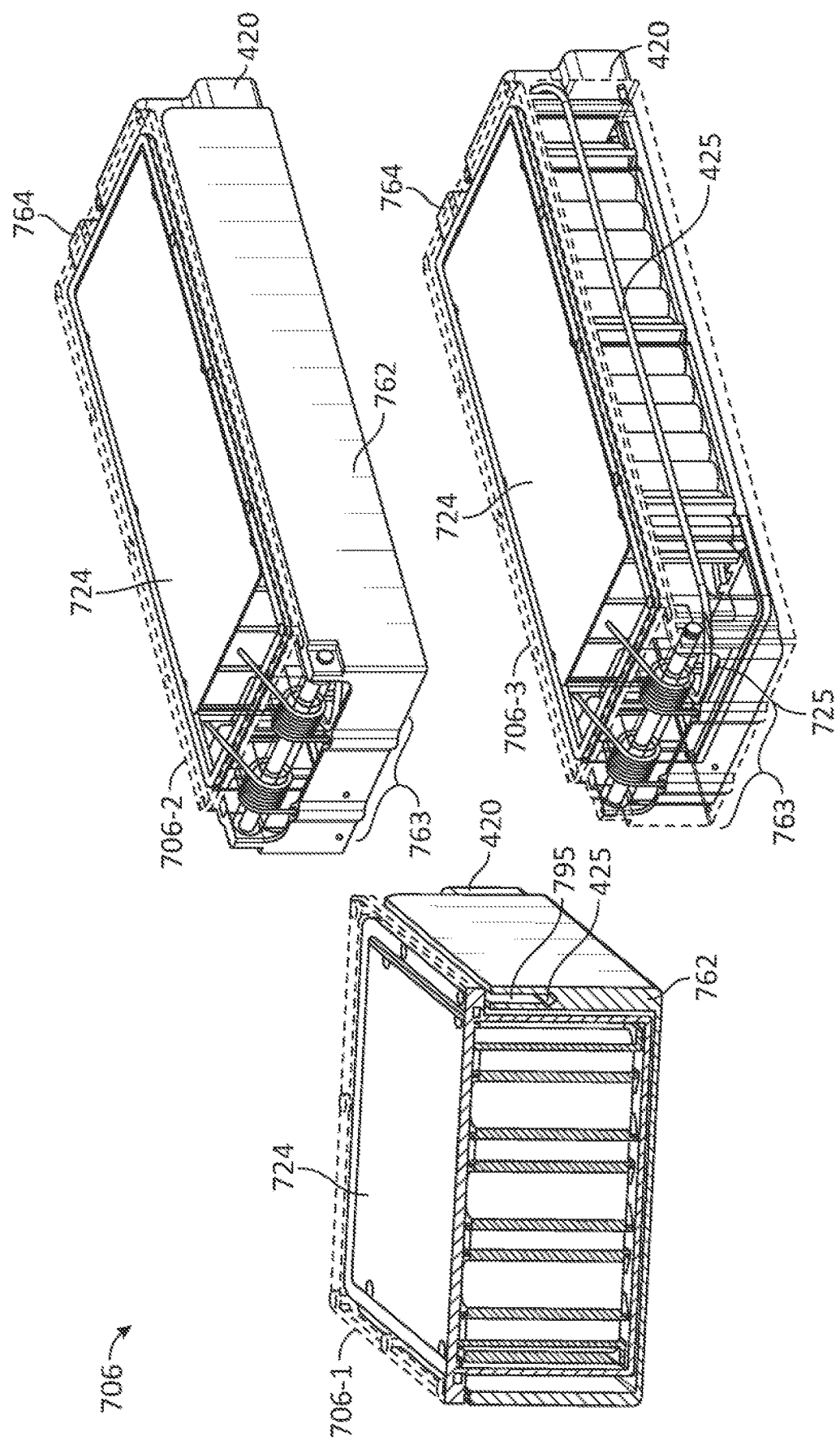

FIG. 7D presents various internal views of modular battery assembly 724 locked within subframe assembly 762, as shown in step 706 of FIG. 7A. In FIG. 7D, cross section view 706-1 shows power bus 425 routed through wiring channel 795 of subframe assembly 762 to motor controller 420 mounted to a rear external surface of subframe assembly 762. Orthographic view 706-2 shows modular battery assembly 724 secured within subframe assembly 762 by assembly retention mechanism 764 with tension being applied by hinged assembly retention mechanism 763. Orthographic partial wireframe view 706-3 shows power bus 425 routed from subframe assembly electrical interface 725 through subframe assembly 762 to motor controller 420 mounted to a rear external surface of subframe assembly 762.

Figure 7E:
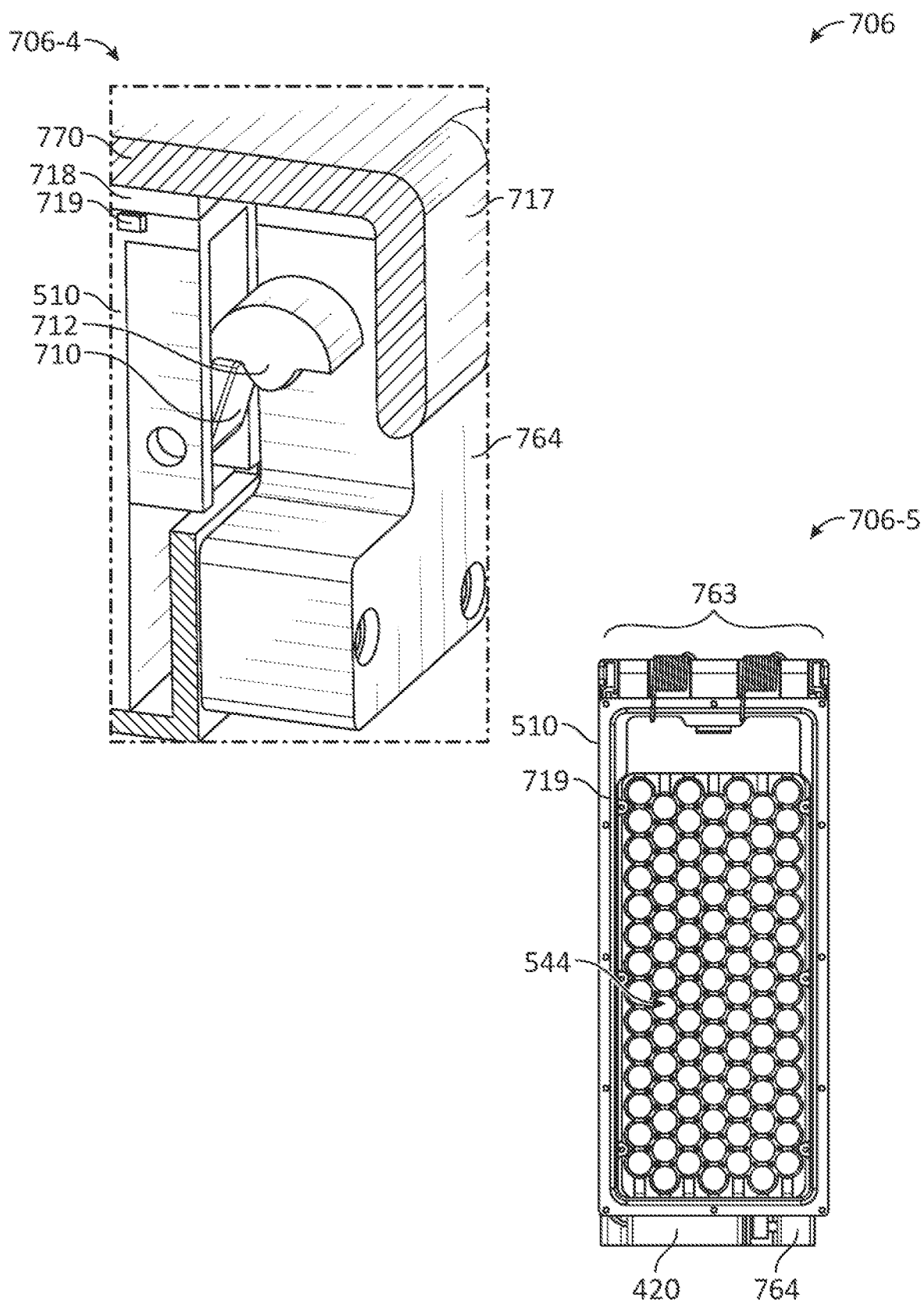

FIG. 7E presents various internal views of modular battery assembly 724 locked within subframe assembly 762, as shown in step 706 of FIG. 7A. In FIG. 7E, close cross section view 706-4 shows pawl 710 of battery assembly enclosure 510 engaged with locking cam 712 of assembly retention mechanism 764. Top down cross section view 706-5 shows a general arrangement of elements of modular battery assembly 724 locked within subframe assembly 762. For example, in the process of pivoting modular battery assembly 724 into subframe assembly 762, pawl 710 may brush over a rounded slip portion of locking cam 712 and latch into a locking surface of locking cam 712, where pawl retention clip 711 of battery assembly enclosure 510 includes a spring configured to allow pawl 710 to collapse against battery assembly enclosure 510 when brushed by the rounded slip portion of locking cam 712 as modular battery assembly 724 is lowered into subframe assembly 762 and to eject pawl 710 to engage and latch into a locking surface of locking cam 712 once modular battery assembly 724 is seated within subframe assembly 762. In various embodiments, assembly retention mechanism 764 may include a worm gear coupled to locking cam 712 and an electromechanical actuator (e.g., controlled by one or more of controller 112, battery management system 442) configured to rotate the worm gear to rotate the locking surface of locking cam 712 away from pawl 710 and release pawl 710 and/or modular battery assembly 724 from subframe assembly 762. In various embodiments, because hinged assembly retention mechanism 763 is spring tensioned against lowering modular battery assembly 724 into subframe assembly 762, release of pawl 710 may cause modular battery assembly 724 to automatically pivot out of subframe assembly 762.

Figure 8B:
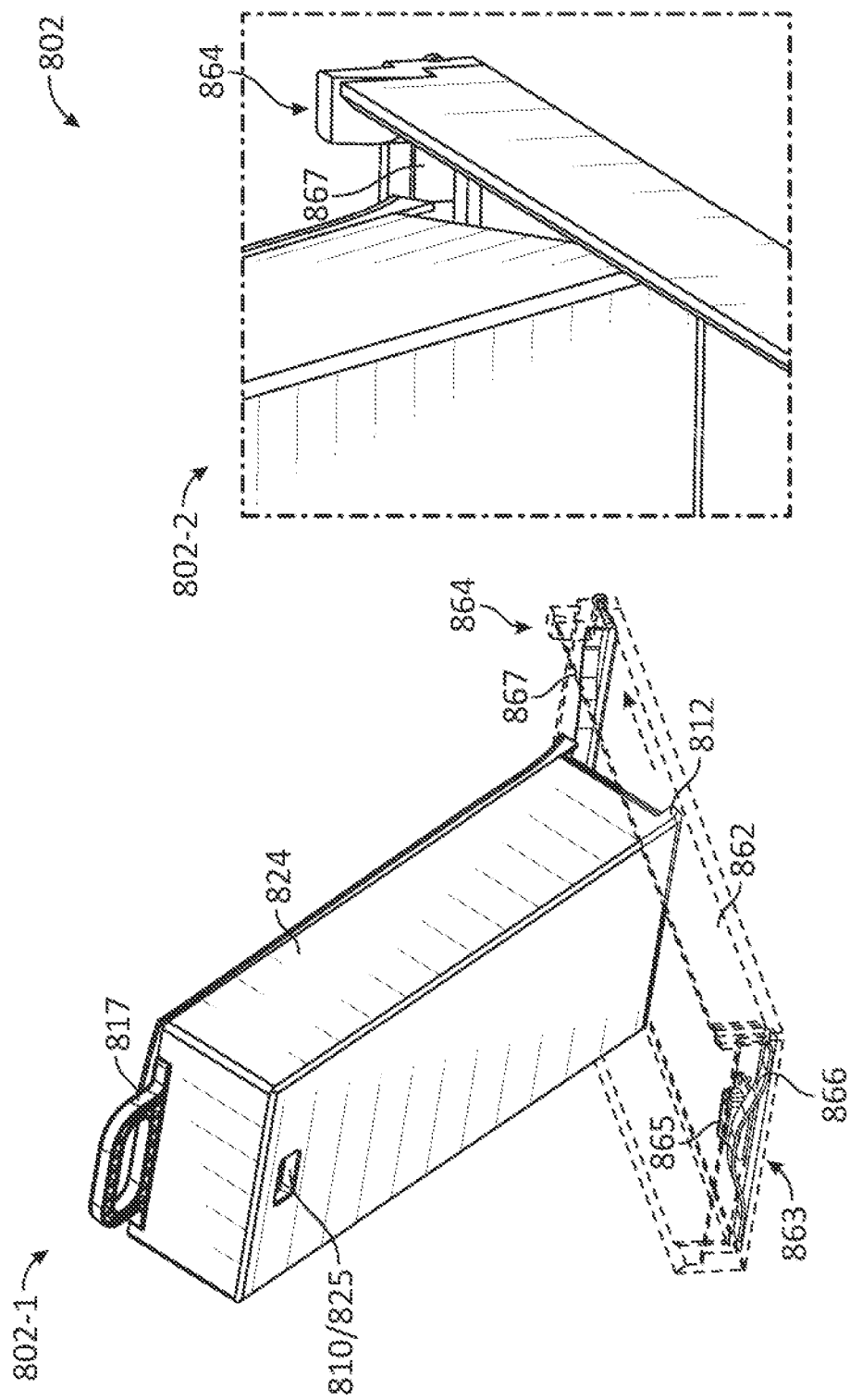

FIGS. 8A-D illustrate various aspects of a modular battery assembly 824 for a micro-mobility fleet vehicle (e.g., micro-mobility fleet vehicle 410) in accordance with embodiments of the disclosure. In particular, FIG. 8A shows three steps 802, 804, and 806 for installing modular battery assembly 824 into a subframe assembly 862 implemented as a subframe case coupled between tubular frame members 460 and 461 and including a push latch head assembly retention mechanism 863 (e.g., a push latch head assembly retention mechanism disposed towards head tube 321 and/or a front of micro-mobility fleet vehicle 410) and a slide lever tail assembly retention mechanism 864 (e.g., a slide lever assembly retention mechanism disposed towards rear tire 322 and/or a rear of micro-mobility fleet vehicle 410). In the embodiment shown in FIG. 8A, subframe assembly 862 includes a floorpan panel 874 providing a floorpan for micro-mobility fleet vehicle 410 configured to protect modular battery assembly 824 from road debris.

In step 802, a fleet servicer technician may use battery assembly handle 817 to position modular battery assembly 824 in subframe assembly 862 with battery assembly retention interface 812 (e.g., a slide lever feature) in contact and able to slide along a bottom surface of subframe assembly 862, such that arched floorboard panel 870 is facing substantially towards a rear of micro-mobility fleet vehicle 410 and/or away from subframe assembly 862. In step 804, battery assembly retention interface 812 of modular battery assembly 824 is slid along a bottom surface of subframe assembly 862 towards slide lever tail assembly retention mechanism 864 to at least partially engage with and form a fulcrum at slide lever tail assembly retention mechanism 864, and battery assembly retention interface 810 (e.g., a recessed latch receptacle which may be integrated with battery assembly electric interface 825) is lowered towards subframe assembly 862 and/or kickstand 884.

In step 806, modular battery assembly 824 is levered into subframe assembly 862 via a fulcrum formed by battery assembly retention interface 812 and slide lever tail assembly retention mechanism 864 and secured in place by push latch head assembly retention mechanism 863. In alternative embodiments, a similar series of steps may be used to install modular battery assembly 824 into a subframe assembly implemented as a subframe case coupled between tubular frame members 460 and 461 and including a push latch tail assembly retention mechanism and a slide lever head assembly retention mechanism. Steps 802, 803, and 804 may generally be reversed to remove modular battery assembly 824 from subframe assembly 862.

FIG. 8B presents various views of battery assembly retention interface 812 (e.g., a slide lever feature) in contact and sliding along a bottom surface of subframe assembly 862 towards slide lever assembly retention mechanism 864 as modular battery assembly 824 is rotated and battery assembly retention interface 810 (e.g., a recessed latch receptacle) is lowered towards push latch assembly retention mechanism 863, as shown in step 802 of FIG. 8A. In FIG. 8B, orthographic view 802-1 shows battery assembly retention interface 812 implemented with a rounded radius to facilitate natural and unhindered rotation and sliding of battery assembly retention interface 812 towards slide lever assembly retention mechanism 864. Slide lever assembly retention mechanism 864 may include leaf spring 867 configured to protect battery assembly retention interface 812 from hard contact with slide lever assembly retention mechanism 864 and to provide tension against tolerance slack in the sizing of the various components. Push latch assembly retention mechanism 863 may include push latch feature 865 configured to mate with battery assembly retention interface 810 and/or battery assembly electrical interface 825, for example, and may include leaf spring 866 configured to protect battery assembly retention interface 810 from hard contact with push latch assembly retention mechanism 863 and to provide tension against latching battery assembly retention interface 810 to push latch assembly retention mechanism 863. Close orthographic view 802-2 shows battery assembly retention interface 812 approaching slide lever assembly retention mechanism 864.

Figure 8C:
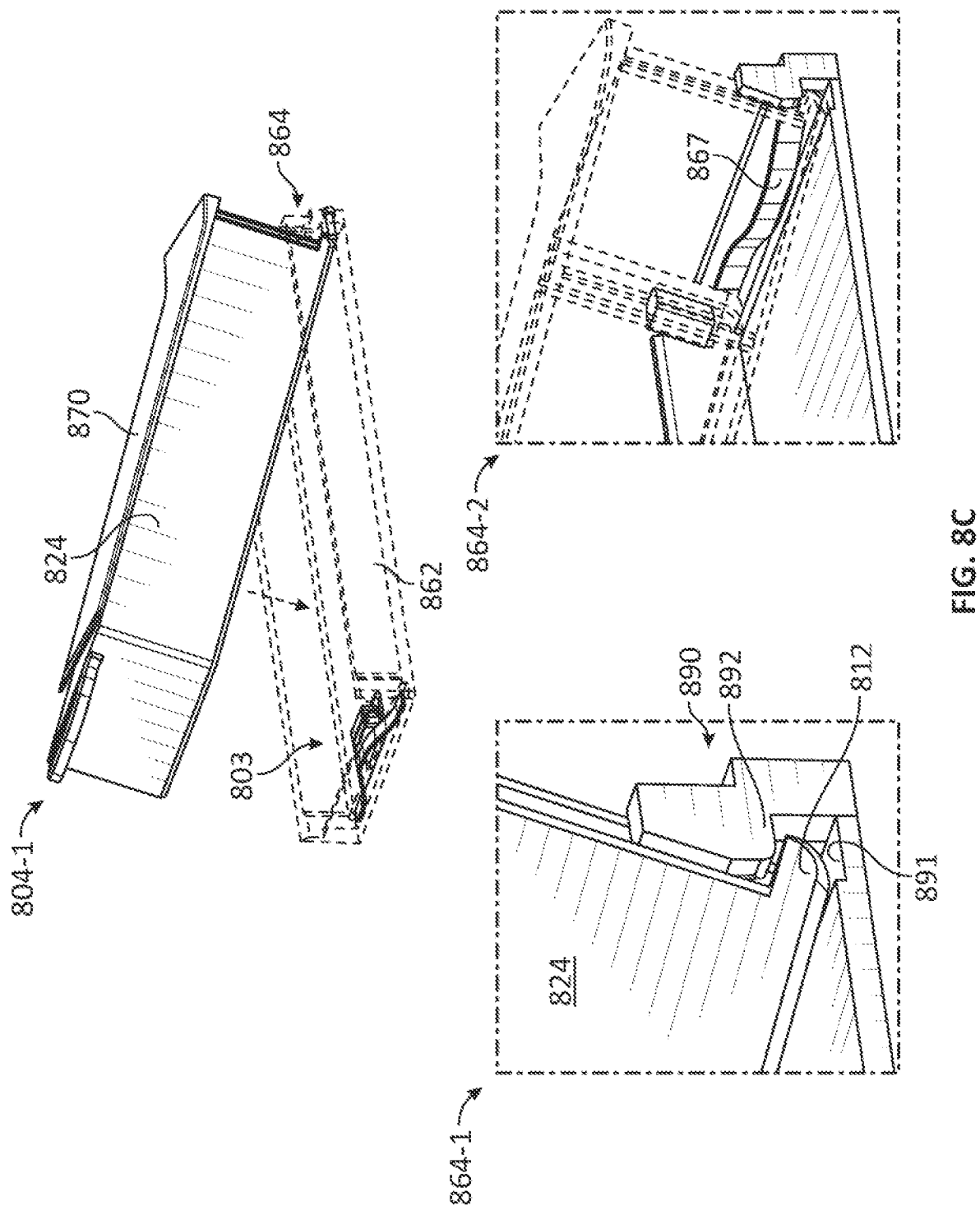

FIG. 8C presents various views of battery assembly retention interface 812 engaging with slide lever assembly retention mechanism 864, as shown in step 804 of FIG. 8A. In FIG. 8C, orthographic view 804-1 shows battery assembly retention interface 812 engaged with and creating a fulcrum at slide lever assembly retention mechanism 864, which allows modular battery assembly 824 to be levered down into subframe assembly 862 such that battery assembly retention interface 810 is properly aligned with push latch assembly retention mechanism 863. For example, as shown in close view 864-1 of slide lever assembly retention mechanism 864, slide lever assembly retention mechanism 864 may include a backstop member 890 forming a backstop recess 891 configured to receive battery assembly retention interface 812 and fulcrum guide 892 configured to form a lever fulcrum with battery assembly retention interface 812 that is tensioned, at least in part, by leaf spring 866 (e.g., as shown in wire frame view 864-2).

Figure 8D:
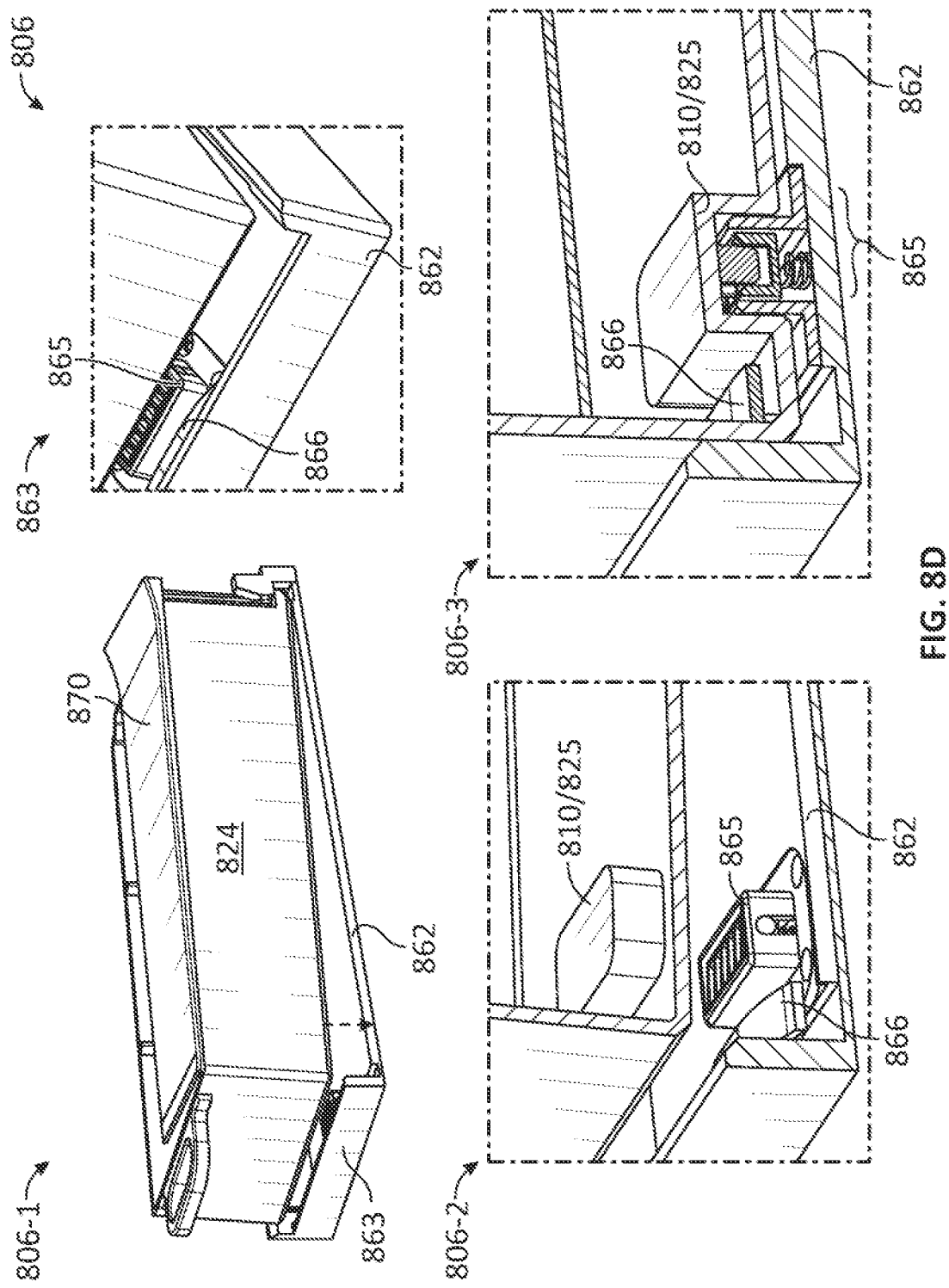

FIG. 8D presents various views of modular battery assembly 824 being levered into subframe assembly 862 to engage battery assembly retention interface 810 with push latch assembly retention mechanism 863, as shown in step 806 of FIG. 8A. In FIG. 8D, orthographic view 806-1 shows modular battery assembly 824 being levered into subframe assembly 862 to position battery assembly retention interface 810 over push latch assembly retention mechanism 863. As shown in FIG. 8D, push latch assembly retention mechanism 863 may include push latch feature 865 configured to mate with battery assembly retention interface 810 and/or battery assembly electrical interface 825, for example, and may include leaf spring 866 configured to protect battery assembly retention interface 810 from hard contact with push latch assembly retention mechanism 863 and to provide tension against latching battery assembly retention interface 810 to push latch feature 865 of push latch assembly retention mechanism 863. Close cross section view 806-2 shows battery assembly retention interface 810 just above push latch feature 865, and close cross section view 806-2 shows battery assembly retention interface 810 mated with and latched to push latch feature 865 of push latch assembly retention mechanism 863 and tensioned by leaf spring 866.

In various embodiments, push latch assembly retention mechanism 863 may include a worm gear coupled to push latch feature 865 and an electromechanical actuator (e.g., controlled by one or more of controller 112, battery management system 442) configured to rotate the worm gear to rotate a locking surface or slot of push latch feature 865 and release battery assembly retention interface 810 and/or modular battery assembly 824 from subframe assembly 862. In various embodiments, because push latch assembly retention mechanism 863 is spring tensioned against lowering modular battery assembly 824 into subframe assembly 862, release of battery of 44 assembly retention interface 810 may cause modular battery assembly 824 to automatically lever out of subframe assembly 862.

Figure 9A:
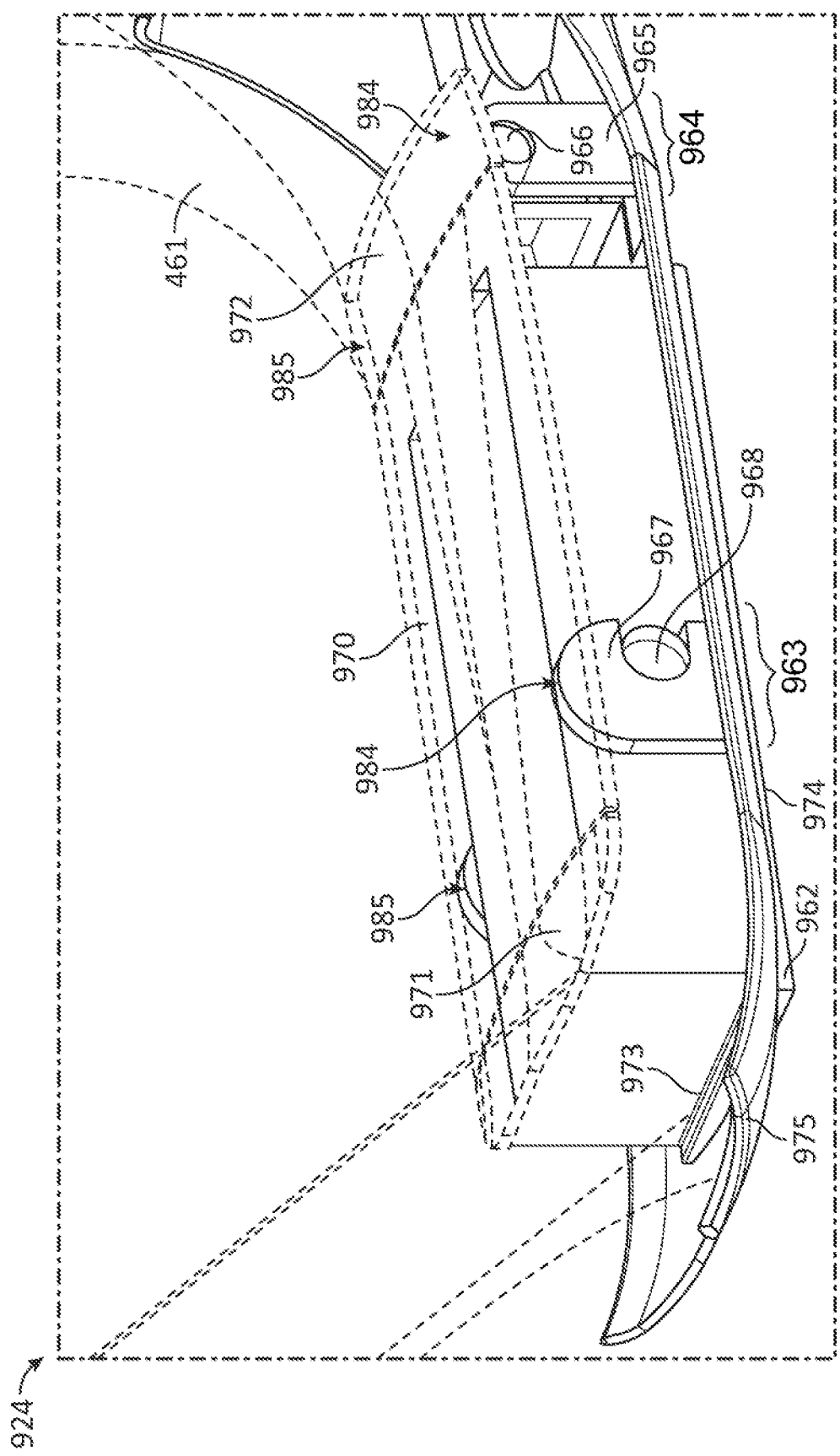

FIGS. 9A-B illustrate various aspects of a modular battery assembly 924 for a micro-mobility fleet vehicle (e.g., micro-mobility fleet vehicle 410) in accordance with embodiments of the disclosure. In the embodiment shown in FIG. 9A, modular battery assembly 924 may be secured to subframe assembly 962 via slip pin head assembly retention mechanism 963 and lock pin tail assembly retention mechanism 964. For example, slip pin head assembly retention mechanism 963 may include slip pin tabs 967 (e.g., left and right slip pin tabs) configured to receive respective slip pins/battery assembly retention interfaces 968 as modular battery assembly 924 is inserted into subframe assembly 962 generally from a read of micro-mobility fleet vehicle 410. Lock pin tail assembly retention mechanism 964 may include lock pin tabs 965 configured to receive respective lock pins/battery assembly retention interfaces 966 as modular battery assembly 924 is first slipped into slip pin tabs 967 (e.g., forming a fulcrum at slip pin tabs 967) and then levered down into subframe assembly 962 to engage lock pin tabs 965 with lock pins 966. In some embodiments, modular battery assembly 924 may include deformable preloading member 973 configured to tension against subframe assembly 962 to dissipate vibrations during operation and deform to allow for slip fit clearance for battery replacement. In various embodiments, subframe assembly 962 includes a floorboard panel 974 providing a floorboard for micro-mobility fleet vehicle 410 configured to protect modular battery assembly 924 from road debris.

As shown in FIG. 9A, modular battery assembly 924 may include arched floorboard panel 970 configured both to protect modular battery assembly 924 and to form a structural member of micro-mobility fleet vehicle 410 configured to distribute a step weight of a rider (e.g., weight applied to a top surface of arched floorboard panel 970 by a rider operating micro-mobility fleet vehicle 410) to subframe assembly 962 and/or tubular frame members 460 and 461. For example, arched floorboard panel 970 may be formed according to a tensioned arch extending laterally between tubular frame members 460 and 461 so as to distribute the step weight laterally towards tubular frame members 460 and 461, for example, or into subframe assembly 974 (e.g., which may be welded to tubular frame members 460 and 461). Moreover, such tensioned arch may be shaped to form an air gap between arched floorboard panel and enclosure lid 918, for example, to reduce thermal loading caused by sunlight. In some embodiments, arched floorboard panel 970 may include head flange 971 disposed towards a front of micro-mobility fleet vehicle 410 and tail flange 972 disposed towards a rear of micro-mobility fleet vehicle 410, where head flange 971 and tail flange 972 are shaped to form water resistant seals against water ingress into subframe assembly 962. In various embodiments, arched floorboard panel 970 may be tensioned and/or supported by slip pin tabs 967 and lock pin tabs 965 at left and right tensioning points 984 and 985.

For example, as shown in FIG. 9B, lateral cross section view 924a illustrates that arched floorboard panel 970 may include arch support guides 969 configured to receive slip pin tabs 967 and lock pin tabs 965 and provide lateral compression of, and vertical support for, arched floorboard panel 970, which act together to retain the lateral arch shape of arched floorboard panel 970. In addition, arched floorboard panel 970 may include overhangs 980 and 981, for example, which may be configured to tension against left and right tubular frame members 460 and 461 to provide lateral compression of arched floorboard panel 970. In some embodiments, modular battery assembly 924 may be configured to contact subframe assembly 962 at case perimeters 982 and 983 (e.g., disposed below an enclosure lip of a battery assembly enclosure of modular battery assembly 924) and provide lateral tensioning and/or vertical support for arched floorboard panel 970 through such contact. Lateral cross section view 924a and longitudinal cross section view 924b illustrate how features of arched floorboard panel 970, including head flange 971 and tail flange 972 are shaped to form water resistant seals against water ingress into subframe assembly 962, such that water streams 988 and 989 flow around electrical components of propulsion system 122, for example, and/or water streams 986 and 987 flow outside subframe assembly 962 even if they do not flow outside tubular frame members 460/461.

Figure 10:
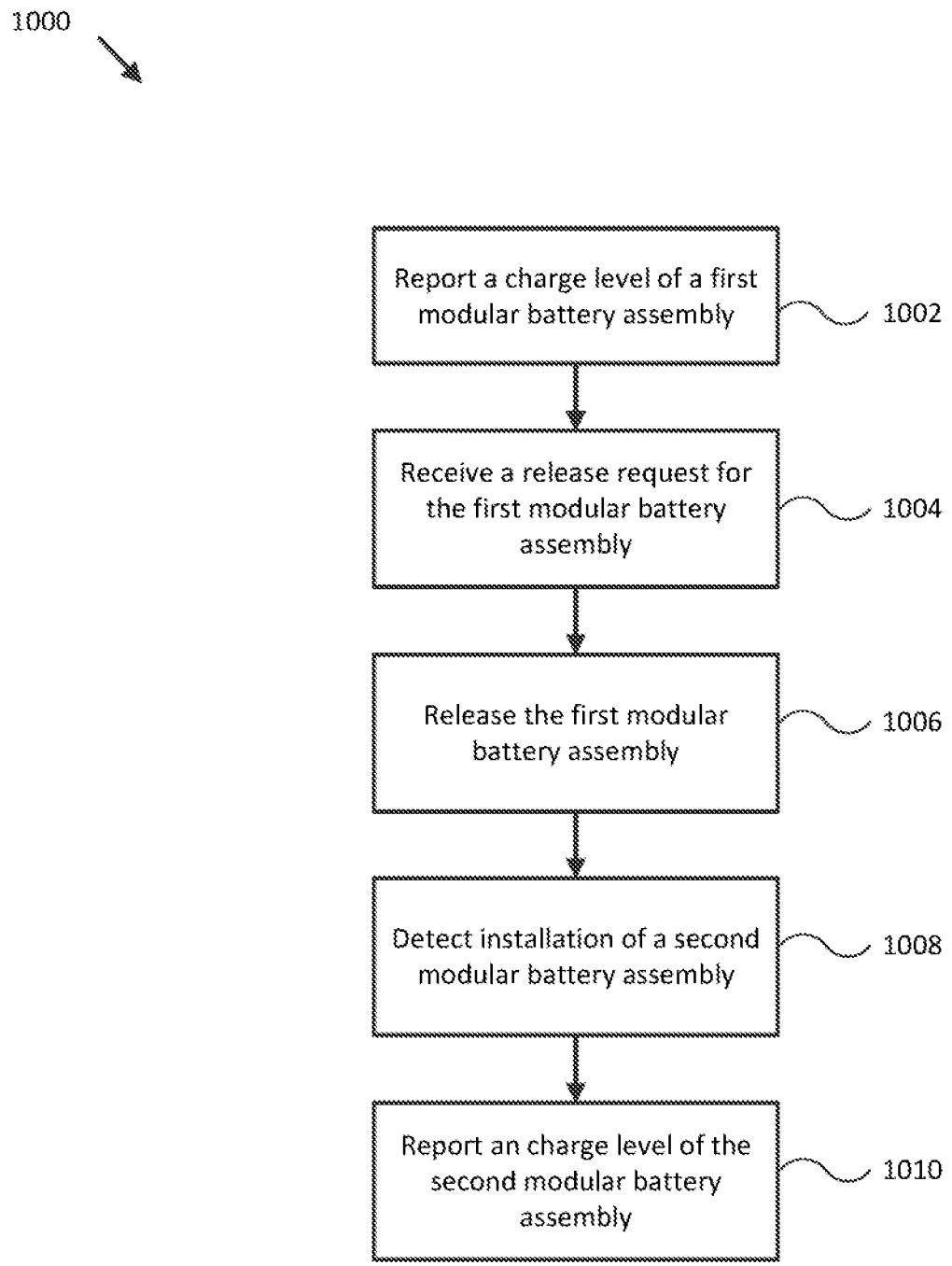
FIG. 10 illustrates a flow diagram of a process to replace (e.g., remove and/or install) a modular battery assembly for a micro-mobility fleet vehicle in accordance with an embodiment of the disclosure.

FIG. 10 illustrates a flow diagram of a process 1000 to replace (e.g., remove and/or install) a modular battery assembly for a micro-mobility fleet vehicle (e.g., micro-mobility fleet vehicle 410) in accordance with an embodiment of the disclosure. It should be appreciated that any step, sub-step, sub-process, or block of process 1000 may be performed in an order or arrangement different from the embodiments illustrated by FIG. 10. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1000 is described with reference to systems, processes, control loops, and images described in reference to FIGS. 1-9E, process 1000 may be performed by other systems different from those systems, processes, control loops, and images and including a different selection of electronic devices, sensors, assemblies, mobile structures, and/or mobile structure attributes, for example.

In block 1002, a charge level of a modular battery assembly is reported. For example, controller 112 of micro-mobility fleet vehicle 410 may be configured to report a charge level of modular battery assembly 424, other battery monitoring data, and/or other vehicle status data to management system 240 via one or more of fleet data links 436. In some embodiments, controller 112 may be configured to monitor such charge level and report the charge level upon detecting it has fallen below a predetermined minimum charge level. In other embodiments, controller 112 may be configured to receive periodic vehicle status requests from management system 240 and report the charge level as part of a vehicle status report provided to management system 240. Such reporting may in some embodiments include a variety of contextual status information, such as location, time of day, and declined rentals (e.g., due to too low a charge level for a requested trip), which may be used to help determine whether to replace modular battery assembly 424 with a charged modular battery assembly.

In block 1004, a release request for a modular battery is received. For example, controller 112 of micro-mobility fleet vehicle 410 may be configured to receive a release requests (e.g., as fleet status data) from a user device of a fleet service technician, from management system 240, and/or from another authorized entity, including in some instances a rider of micro-mobility fleet vehicle 410. Upon receiving such release request, controller 112 may proceed direction to block 1006, for example, or may notice various elements of systems 100 or 400 that modular battery assembly 424 will be released. Upon such notice, battery management system 442 may be configured to store related vehicle status information to memory 447. In alternative embodiments, controller 112 may be configured to provide a snapshot of all available vehicle status information to battery management system 442 of modular battery assembly 424, and battery management system 442 may be configured to store such information and notice controller 112 upon completion. Controller 112 may be configured to delay release until such notice is received.

In block 1006, a modular battery assembly is released. For example, controller 112 of micro-mobility fleet vehicle 410 may be configured to control an assembly retention mechanism (e.g., a lock pin tab, locking cam, and/or push latch assembly retention mechanism) to release modular battery assembly 424 from subframe assembly 462, as described herein. Upon such release, battery management system 442 may be configured to detect such release and/or store related vehicle status information to memory 447.

In block 1008, installation of a modular battery assembly is detected. For example, battery management system 442 of modular battery assembly 424 may be configured to detect proper insertion/installation of modular battery assembly 424 into subframe assembly 462 of micro-mobility fleet vehicle 410. In some embodiments, battery management system 442 may be configured to report such detection to controller 112, such as after controller 112 and/or various data buses are powered by modular battery assembly 424.

In block 1010, a charge level of a modular battery assembly is reported. For example, similar to block 1002, controller 112 of micro-mobility fleet vehicle 410 may be configured to report a charge level of modular battery assembly 424, other battery monitoring data, and/or other vehicle status data to management system 240 via one or more of fleet data links 436. In some embodiments, controller 112 may be configured to report such charge level upon detecting the modular battery assembly has been replaced. In other embodiments, controller 112 may be configured to receive periodic vehicle status requests from management system 240 and report the charge level as part of a vehicle status report provided to management system 240. Such reporting may in some embodiments include a variety of contextual status information, such as location, time of day, and declined rentals (e.g., due to too low a charge level for a requested trip), as described herein.

Embodiments of the present disclosure can thus provide a reliable and robust methodology to reduce burdens associated with servicing micro-mobility fleet vehicles provided for hire by a transportation services provider employing a dynamic transportation matching system to link fleet vehicles to requestors/riders of micro-mobility fleet vehicles, as described herein.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A modular battery assembly for a micro-mobility fleet vehicle, the modular battery assembly comprising:
   a battery assembly enclosure comprising an enclosure cavity and a battery assembly electrical interface, wherein the battery assembly enclosure is configured to enclose a battery cell assembly comprising a plurality of battery cells to be disposed within the enclosure cavity and electrically coupled to the battery assembly electrical interface, and wherein the battery assembly enclosure is further configured to be secured to a subframe assembly of the micro-mobility fleet vehicle; and
   a floorboard panel having an arched shape and being disposed along an uppermost portion of the battery assembly enclosure, wherein the floorboard panel is configured to provide a floorboard surface for the micro-mobility fleet vehicle, and wherein the floorboard panel comprises:
      a first flange disposed along a frontward portion of the floorboard panel and a second flange disposed along a rearward portion of the floorboard panel, the first flange and the second flange being shaped so as to form a seal over the subframe assembly; and
      a plurality of arch support guides configured to receive a first plurality of pin tabs and a second plurality of pin tabs for supporting the floorboard panel, wherein the plurality of arch support guides is positioned directly alongside the floorboard panel, and wherein the plurality of arch support guides is further configured to provide a lateral compression of the floorboard panel so as to restrict the floorboard panel to the arched shape,
      wherein the first plurality of pin tabs comprises a plurality of lock pin tabs configured to receive lock pins for securing the battery assembly enclosure to the subframe assembly.

2. The modular battery assembly of claim 1, wherein the second plurality of pin tabs comprises a plurality of slip pin tabs configured to receive a plurality of slip pins for facilitating an insertion of the battery assembly enclosure into the subframe assembly.

3. The modular battery assembly of claim 1, wherein the first flange comprises a head flange and the second flange comprises a tail flange, the head flange and the tail flange being shaped so as to form a water-resistant seal over the subframe assembly.

4. The modular battery assembly of claim 1, wherein the plurality of arch support guides is further configured to provide the lateral compression and a vertical support of the floorboard panel so as to restrict the floorboard panel to the arched shape.

5. The modular battery assembly of claim 1, wherein the floorboard panel further comprises a plurality of overhangs configured to create a tension with respect to a plurality of tubular frame members coupled to the subframe assembly, and wherein the plurality of overhangs is further configured to provide an additional lateral compression of the floorboard panel.

6. The modular battery assembly of claim 1, wherein the floorboard panel is further configured to both protect the modular battery assembly and to distribute a weight applied to a top surface of the floorboard panel by a rider operating the micro-mobility fleet vehicle.

7. A micro-mobility fleet vehicle, comprising:
a modular battery assembly comprising:
a battery assembly enclosure comprising an enclosure cavity and a battery assembly electrical interface, wherein the battery assembly enclosure is configured to enclose a battery cell assembly comprising a plurality of battery cells to be disposed within the enclosure cavity and electrically coupled to the battery assembly electrical interface, and wherein the battery assembly enclosure is further configured to be secured to a subframe assembly of the micro-mobility fleet vehicle; and
a floorboard panel having an arched shape and being disposed along an uppermost portion of the battery assembly enclosure, wherein the floorboard panel is configured to provide a floorboard surface for the micro-mobility fleet vehicle, and wherein the floorboard panel comprises:
a first flange disposed along a frontward portion of the floorboard panel and a second flange disposed along a rearward portion of the floorboard panel, the first flange and the second flange being shaped so as to form a seal over the subframe assembly; and
a plurality of arch support guides configured to receive a first plurality of pin tabs and a second plurality of pin tabs for supporting the floorboard panel, wherein the plurality of arch support guides is positioned directly alongside the floorboard panel, and wherein the plurality of arch support guides is further configured to provide a lateral compression of the floorboard panel so as to restrict the floorboard panel to the arched shape,
wherein the second plurality of pin tabs comprises a plurality of slip pin tabs configured to receive a plurality of slip pins for facilitating an insertion of the battery assembly enclosure into the subframe assembly.

8. The micro-mobility fleet vehicle of claim 7, wherein the first plurality of pin tabs comprises a plurality of lock pin tabs configured to receive lock pins for securing the battery assembly enclosure to the subframe assembly.

9. The micro-mobility fleet vehicle of claim 7, wherein the first flange comprises a head flange and the second flange comprises a tail flange, the head flange and the tail flange being shaped so as to form a water-resistant seal over the subframe assembly.

10. The micro-mobility fleet vehicle of claim 7, wherein the plurality of arch support guides is further configured to provide the lateral compression and a vertical support of the floorboard panel so as to restrict the floorboard panel to the arched shape.

11. The micro-mobility fleet vehicle of claim 7, wherein the floorboard panel further comprises a plurality of overhangs configured to create a tension with respect to a plurality of tubular frame members coupled to the subframe assembly, and wherein the plurality of overhangs is further configured to provide an additional lateral compression of the floorboard panel.

12. The micro-mobility fleet vehicle of claim 7, wherein the floorboard panel is further configured to both protect the modular battery assembly and to distribute a weight applied to a top surface of the floorboard panel by a rider operating the micro-mobility fleet vehicle.

13. A micro-mobility fleet vehicle, comprising:
a subframe assembly mounted to the micro-mobility fleet vehicle; and
a modular battery assembly comprising:
a battery assembly enclosure comprising an enclosure cavity and a battery assembly electrical interface and being secured to the subframe assembly, wherein the battery assembly enclosure is configured to enclose a battery cell assembly comprising a plurality of battery cells to be disposed within the enclosure cavity and electrically coupled to the battery assembly electrical interface; and
a floorboard panel having an arched shape and being disposed along an uppermost portion of the battery assembly enclosure, wherein the floorboard panel is configured to provide a floorboard surface for the micro-mobility fleet vehicle, and wherein the floorboard panel comprises:
a first flange disposed along a frontward portion of the floorboard panel and a second flange disposed along a rearward portion of the floorboard panel, the first flange and the second flange being shaped so as to form a seal over the subframe assembly; and
a plurality of arch support guides configured to receive a first plurality of pin tabs and a second plurality of pin tabs for supporting the floorboard panel, wherein the plurality of arch support guides is positioned directly alongside the floorboard panel, and wherein the plurality of arch support guides is further configured to provide a lateral compression of the floorboard panel so as to restrict the floorboard panel to the arched shape,
wherein the first plurality of pin tabs comprises a plurality of lock pin tabs configured to receive lock pins for securing the battery assembly enclosure to the subframe assembly.

14. The micro-mobility fleet vehicle of claim 7, wherein the second plurality of pin tabs comprises a plurality of slip pin tabs configured to receive a plurality of slip pins for facilitating an insertion of the battery assembly enclosure into the subframe assembly.

15. The micro-mobility fleet vehicle of claim 7, wherein the first flange comprises a head flange and the second flange comprises a tail flange, the head flange and the tail flange being shaped so as to form a water-resistant seal over the subframe assembly.

16. The micro-mobility fleet vehicle of claim 7, wherein the plurality of arch support guides is further configured to provide the lateral compression and a vertical support of the floorboard panel so as to restrict the floorboard panel to the arched shape.

17. The micro-mobility fleet vehicle of claim 7, wherein the floorboard panel further comprises a plurality of overhangs configured to create a tension with respect to a plurality of tubular frame members coupled to the subframe assembly, and wherein the plurality of overhangs is further configured to provide an additional lateral compression of the floorboard panel.

* * * * *